(12) United States Patent
Tsai et al.

(10) Patent No.: US 8,917,458 B2
(45) Date of Patent: Dec. 23, 2014

(54) IMAGE CAPTURING OPTICAL LENS ASSEMBLY

(75) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 271 days.

(21) Appl. No.: 13/404,008

(22) Filed: Feb. 24, 2012

(65) Prior Publication Data
US 2013/0033764 A1 Feb. 7, 2013

(30) Foreign Application Priority Data
Aug. 4, 2011 (TW) .............................. 100127761 A

(51) Int. Cl.
*G02B 13/18* (2006.01)
*G02B 9/60* (2006.01)
*G02B 13/00* (2006.01)

(52) U.S. Cl.
CPC .................................. *G02B 13/0045* (2013.01)
USPC ......................................... 359/714; 359/764

(58) Field of Classification Search
USPC ......................................... 359/714, 763–764
See application file for complete search history.

(56) References Cited

U.S. PATENT DOCUMENTS

| 7,355,801 | B2 | 4/2008 | Chen et al. |
| 2005/0007678 | A1 | 1/2005 | Sueyoshi |
| 2011/0134305 | A1* | 6/2011 | Sano et al. ..................... 348/340 |
| 2011/0249347 | A1* | 10/2011 | Kubota ......................... 359/764 |
| 2012/0314301 | A1* | 12/2012 | Huang et al. .................. 359/713 |

FOREIGN PATENT DOCUMENTS

| CN | 102132188 A | 7/2011 |
| CN | 202486400 U | 10/2012 |
| JP | 2010152042 A | 7/2010 |
| WO | 2011086827 A1 | 7/2011 |

* cited by examiner

*Primary Examiner* — Jordan Schwartz
(74) *Attorney, Agent, or Firm* — CKC & Partners Co., Ltd.

(57) ABSTRACT

An image capturing optical lens assembly includes, in order from an object side to an image side, a first lens element, a second lens element, a third lens element, a fourth lens element and a fifth lens element. The first lens element has positive refractive power. The second lens element has negative refractive power. The third lens element with refractive power has a convex object-side surface, wherein the object-side surface and an image-side surface of the third lens element are aspheric. The fourth lens element with positive refractive power has a convex object-side surface and a convex image-side surface. The fifth lens element with negative refractive power which is made of plastic material, wherein an object-side surface and an image-side surface of the fifth lens element are aspheric, and the fifth lens element has inflection points formed on at least one surface thereof.

21 Claims, 20 Drawing Sheets

IMAGE CAPTURING OPTICAL LENS ASSEMBLY

RELATED APPLICATIONS

The application claims priority to Taiwan Application Serial Number 100127761, filed Aug. 4, 2011, which is herein incorporated by reference.

BACKGROUND

1. Technical Field

The present invention relates to an image capturing optical lens assembly. More particularly, the present invention relates to a compact image capturing optical lens assembly applicable to electronic products.

2. Description of Related Art

In recent years, with the popularity of mobile products with camera functionalities, the demand for miniaturizing an image capturing optical lens assembly is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact image capturing optical lens assemblies have gradually evolved toward the field of higher megapixels, there is an increasing demand for compact image capturing optical lens assemblies featuring better image quality.

A conventional compact image capturing optical lens assembly employed in a portable electronic product mainly adopts a four-element lens structure. Due to the popularity of mobile products with high specification, such as Smart Phones and PDAs (Personal Digital Assistants), the pixel and image-quality requirements of the compact image capturing optical lens assembly have increased rapidly. However, the conventional four-piece lens structure cannot satisfy the requirements of the compact image capturing optical lens assembly. Furthermore, the trend in modern electronics is developed toward increasingly higher performance and compact size. Therefore, a need exists in the art for providing an image capturing optical lens assembly for use in a mobile electronic product that has excellent imaging quality without too long total track length.

SUMMARY

According to one aspect of the present disclosure, an image capturing optical lens assembly includes, in order from an object side to an image side, a first lens element, a second lens element, a third lens element, a fourth lens element and a fifth lens element. The first lens element has positive refractive power. The second lens element has negative refractive power. The third lens element with refractive power has a convex object-side surface, wherein the object-side surface and an image-side surface of the third lens element are aspheric. The fourth lens element with positive refractive power has a convex object-side surface and a convex image-side surface. The fifth lens element with negative refractive power which is made of plastic material, wherein an object-side surface and an image-side surface of the third lens element are aspheric, and the fifth lens element has at least one inflection point formed on at least one of the object-side surface and the image-side surface thereof. When a curvature radius of the object-side surface of the fourth lens element is R7, a curvature radius of the image-side surface of the fourth lens element is R8, and the following relationship is satisfied:

$-5.8 < R7/R8 < 0$.

According to another aspect of the present disclosure, an image capturing optical lens assembly includes, in order from an object side to an image side, a first lens element, a second lens element, a third lens element, a fourth lens element and a fifth lens element. The first lens element has positive refractive power. The second lens element has negative refractive power. The third lens element has refractive power, wherein an object-side surface and an image-side surface of the third lens element are aspheric. The fourth lens element with positive refractive power has a convex object-side surface and a convex image-side surface, wherein the object-side surface and the image-side surface of the fourth lens element are aspheric. The fifth lens element with negative refractive power which is made of plastic material, wherein an object-side surface and an image-side surface of the fifth lens element are aspheric, and the fifth lens element has at least one inflection point formed on at least one of the object-side surface and the image-side surface thereof. When a curvature radius of the object-side surface of the fourth lens element is R7, a curvature radius of the image-side surface of the fourth lens element is R8, a focal length of the image capturing optical lens assembly is f, the focal length of the second lens element is f2, a focal length of the fourth lens element is f4, and the following relationships are satisfied:

$-5.8 < R7/R8 < 0$;

$1.1 < f/f4 < 3.0$; and $-1.4 < f/f2 < -0.61$.

According to yet another aspect of the present disclosure, an image capturing optical lens assembly includes, in order from an object side to an image side, a first lens element, a second lens element, a third lens element, a fourth lens element and a fifth lens element. The first lens element has positive refractive power. The second lens element has negative refractive power. The third lens element has refractive power, wherein an object-side surface and an image-side surface of the third lens element are aspheric. The fourth lens element with positive refractive power has a convex object-side surface and a convex image-side surface. The fifth lens element with refractive power which is made of plastic material and has a concave image-side surface, wherein an object-side surface and the image-side surface of the third lens element are aspheric. When a curvature radius of the object-side surface of the fourth lens element is R7, a curvature radius of the image-side surface of the fourth lens element is R8, a focal length of the image capturing optical lens assembly is f, a curvature radius of the object-side surface of the second lens element is R3, a curvature radius of the image-side surface of the second lens element is R4, and the following relationships are satisfied:

$-5.8 < R7/R8 < 0$;

$0.4 < f/f1 < 1.3$; and $0 < (R3+R4)/(R3-R4) < 3.0$.

According to further another aspect of the present disclosure, an image capturing optical lens assembly includes, in order from an object side to an image side, a first lens element, a second lens element, a third lens element, a fourth lens element and a fifth lens element. The first lens element has positive refractive power. The second lens element has negative refractive power. The third lens element has refractive power, wherein an object-side surface and an image-side surface of the third lens element are aspheric. The fourth lens element with positive refractive power has a convex object-side surface and a convex image-side surface. The fifth lens element with refractive power which is made of plastic material and has a concave image-side surface, wherein an object-side surface and the image-side surface of the fifth lens element are aspheric. When a curvature radius of the object-side surface of the fourth lens element is R7, a curvature radius of the image-side surface of the fourth lens element is R8, a focal length of the image capturing optical lens assembly is f, a focal length of the first lens element is f1, a focal length of the second lens element is f2, a focal length of the fourth lens element is f4, and the following relationships are satisfied:

$-5.8 < R7/R8 < 0$;

$1.1 < f/f4 < 3.0$; and $-1.3 < f1/f2 < -0.48$.

DETAILED DESCRIPTION

Figure 1:
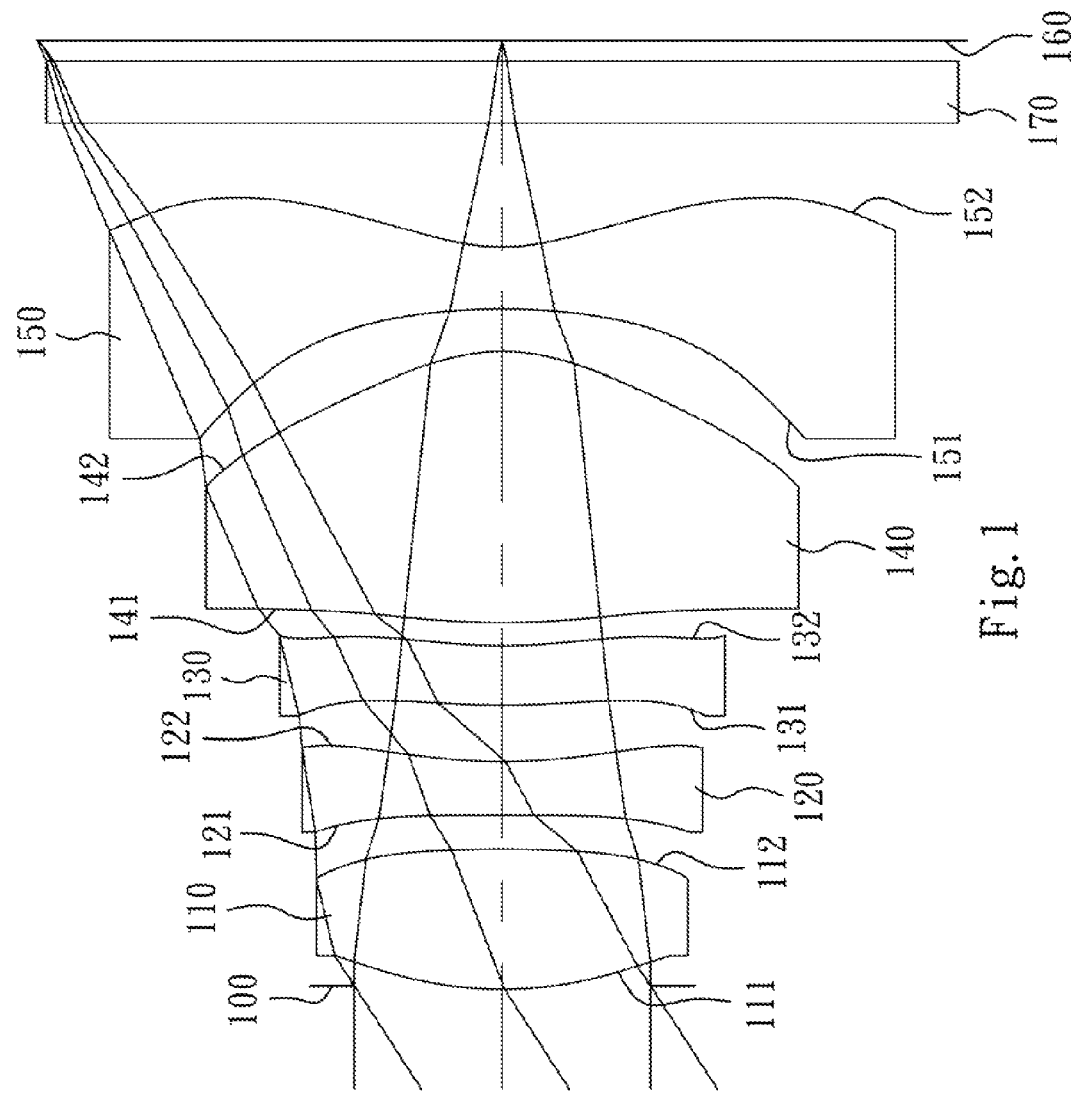
FIG. 1 is a schematic view of an image capturing optical lens assembly according to the first embodiment of the present disclosure.

An image capturing optical lens assembly includes, in order from an object side to an image side, a first lens element, a second lens element, a third lens element, a fourth lens element and a fifth lens element. The image capturing optical lens assembly further includes an image sensor located on the image plane.

The first lens element with positive refractive power provides partial refractive power for reducing the total track length of the image capturing optical lens assembly.

The second lens element with negative refractive power can correct the aberration generated from the first lens element with positive refractive power.

The third lens element is made of plastic material and has refractive power, which can be positive refractive power or negative refractive power. When the third lens element has positive refractive power, the sensitivity of the image capturing optical lens assembly can be reduced by distributing the positive refractive power of the first lens element. When the third lens element has negative refractive power, the third lens element can reduce the sensitivity of the image capturing optical lens assembly with the second lens element. The third lens element has a convex object-side surface and a concave image-side surface, so that the back focal length of the image capturing optical lens assembly is enough for setting other elements. Furthermore, the object-side surface and the image-side surface of the third lens element are aspheric.

The fourth lens element with positive refractive power can provide main refractive power for reducing the total track length of the image capturing optical lens assembly. The fourth lens element has a convex object-side surface and a convex image-side surface, so that the astigmatism and the high order aberration of the image capturing optical lens assembly can be corrected. The fourth lens element is made of plastic material, and the object-side surface and the image-side surface thereof are aspheric.

The fifth lens element with negative refractive power can correct the Petzval Sum of the image capturing optical lens assembly for smoothing the peripheral area of the image. The fifth lens element has a concave image-side surface, so that the principal point of the image capturing optical lens assembly can be positioned away from the image plane, and the total track length of the image capturing optical lens assembly can be reduced so as to maintain the compact size of the image capturing optical lens assembly. The object-side surface and an image-side surface of the fifth lens element are aspheric, and the fifth lens element has at least one inflection point formed on at least one of the object-side surface and the image-side surface thereof. Therefore, the incident angle of the off-axis field on the image sensor can be effectively minimized and the aberration can be corrected as well.

When a curvature radius of the object-side surface of the fourth lens element is R7, and a curvature radius of the image-side surface of the fourth lens element is R8, the following relationship is satisfied:

$$-5.8 < R7/R8 < 0.$$

Therefore, the curvatures of the surfaces of the fourth lens element are proper which can reduce the total track length of the image capturing optical lens assembly.

R7 and R8 can further satisfy the following relationship:

$$-4.3 < R7/R8 < -0.8.$$

Moreover, R7 and R8 satisfy the following relationship:

$$-3.3 < R7/R8 < -1.1.$$

When a focal length of the image capturing optical lens assembly is f, and a focal length of the fourth lens element is f4, the following relationship is satisfied:

$$1.1 < f/f4 < 3.0.$$

Therefore, the refractive power of the fourth lens element can correct the aberration and the photosensitivity of the image capturing optical lens assembly.

When a curvature radius of the object-side surface of the second lens element is R3, and a curvature radius of the image-side surface of the second lens element is R4, the following relationship is satisfied:

$$0 < (R3+R4)/(R3-R4) < 3.0.$$

Therefore, the refractive power of the second lens element is proper by adjusting the curvatures of the surfaces of the second lens element.

When the Abbe number of the first lens element is V1, and the Abbe number of the second lens element is V2, the following relationship is satisfied:

$$30 < V1-V2 < 42.$$

Therefore, the chromatic aberration of the image capturing optical lens assembly can be corrected.

When a focal length of the first lens element is f1, and the focal length of the second lens element is f2, the following relationship is satisfied:

$$-1.3 < f1/f2 < -0.48.$$

Therefore, the aberration of the image capturing optical lens assembly can be corrected.

When the focal length of the image capturing optical lens assembly is f, and the focal length of the second lens element is f2, the following relationship is satisfied:

$$-1.4 < f/f2 < -0.61.$$

Therefore, the refractive power of the second lens element can correct the aberration generated from the first lens element.

When the focal length of the image capturing optical lens assembly is f, and the focal length of the first lens element is f1, the following relationship is satisfied:

$$0.4 < f/f1 < 1.3.$$

Therefore, the refractive power of the first lens element is proper, so that the total tract length of the image capturing optical lens assembly can be reduced in order to maintain the compact size thereof.

According to the image capturing optical lens assembly of the present disclosure, the lens elements thereof can be made of plastic material or glass. When the lens elements are made of glass material, the range of the refractive power of the image capturing optical lens assembly can be set may be increased. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the image capturing optical lens assembly can also be reduced.

According to the optical image capturing assembly of the present disclosure, when the lens element has a convex surface, it indicates that the paraxial region of the surface is convex; and when the lens element has a concave surface, it indicates that the paraxial region of the surface is concave.

According to the image capturing optical lens assembly of the present disclosure, the image capturing optical lens assembly can include at least one stop, may it be glare stop or field stop, for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the designer of the optical system, in order to achieve the desirable optical features or higher image quality produced from the optical system.

According to the above description of the present disclosure, the is following 1st-10th specific embodiments are provided for further explanation.

Figure 2:
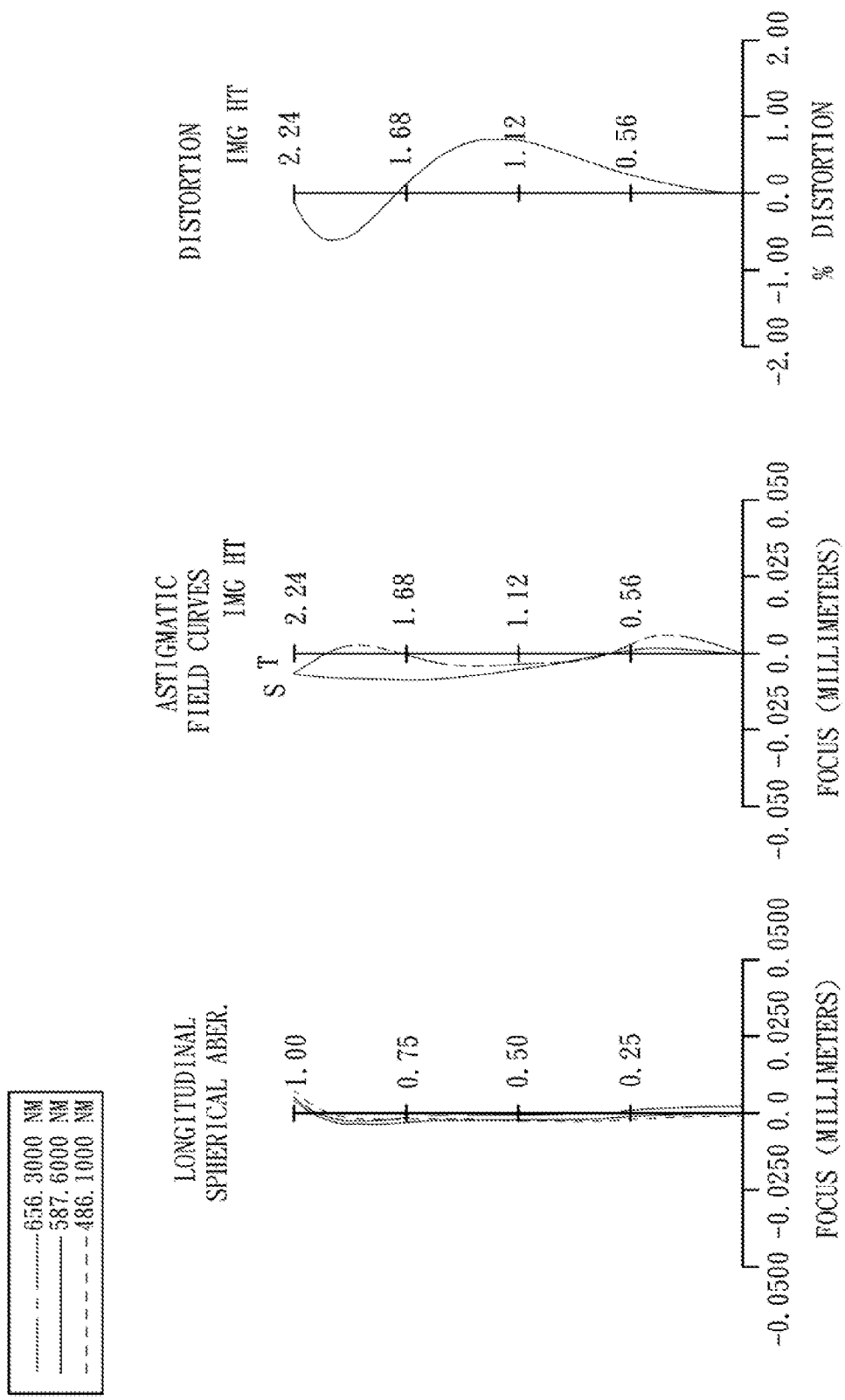
FIG. 2 shows spherical aberration curves, astigmatic field curves and a distortion curve of the image capturing optical lens assembly according to the first embodiment.

FIG. 1 is a schematic view of an image capturing optical lens assembly according to the first embodiment of the present disclosure. FIG. 2 shows spherical aberration curves, astigmatic field curves and a distortion curve of the image capturing optical lens assembly according to the first embodiment. In FIG. 1, the image capturing optical lens assembly includes, in order from an object side to an image side, an aperture stop 100, the first lens element 110, the second lens element 120, the third lens element 130, the fourth lens element 140, the fifth lens element 150, an IR cut filter 170 and an image plane 160.

The first lens element 110 with positive refractive power has a convex object-side surface 111 and a convex image-side surface 112, and is made of plastic material. The object-side surface 111 and the image-side surface 112 of the first lens element 110 are aspheric. The second lens element 120 with negative refractive power has a concave object-side surface 121 and a concave image-side surface 122, and is made of plastic material. The object-side surface 121 and the image-side surface 122 of the second lens element 120 are aspheric.

The third lens element 130 with negative refractive power has a convex to object-side surface 131 and a concave image-side surface 132, and is made of plastic material. The object-side surface 131 and the image-side surface 132 of the third lens element 130 are aspheric.

The fourth lens element 140 with positive refractive power has a convex object-side surface 141 and a convex image-side surface 142, and is made of plastic material. The object-side surface 141 and the image-side surface 142 of the fourth lens element 140 are aspheric.

The fifth lens element 150 with negative refractive power has a concave object-side surface 151 and a concave image-side surface 152, and is made of plastic material. The object-side surface 151 and the image-side surface 152 of the fifth lens element 150 are aspheric. Furthermore, the fifth lens element 150 has inflection points formed on the object-side surface 151 and the image-side surface 152 thereof.

The IR cut filter 170 is located between the fifth lens element 150 and the image plane 160, and will not affect the focal length of the image capturing optical lens assembly.

The equation of the aspheric surface profiles of the aforementioned lens elements of the first embodiment is expressed as the following:

$$X(Y) = (Y^2/R)/(1 + sqrt(1 - (1+k) \times (Y/R)^2)) + \sum_i (Ai) \times (Y^i)$$

where:

X is the distance of a point on the aspheric surface spaced at a distance Y from the optical axis relative to the tangential plane at the aspheric surface vertex;

Y is the distance from the point on the curve of the aspheric surface to the optical axis;

R is the curvature radius of the surface of the lens element;

k is the conic coefficient; and

Ai is the i-th aspheric coefficient.

In the image capturing optical lens assembly according to the first embodiment, when f is a focal length of the image capturing optical lens assembly, Fno is an f-number of the image capturing optical lens assembly, and HFOV is half of the maximal field of view, these parameters have the following values:

f=3.44 mm;

Fno=2.40; and

HFOV=33.1 degrees.

In the image capturing optical lens assembly according to the first embodiment, when the Abbe number of the first lens element 110 is V1, and the Abbe number of the second lens element 120 is V2, the following relationship is satisfied:

$V1-V2=32.1$.

In the image capturing optical lens assembly according to the first embodiment, when a curvature radius of the object-side surface 121 of the second lens element 120 is R3, and a curvature radius of the image-side surface 122 of the second lens element 120 is R4, the following relationship is satisfied:

$(R3+R4)/(R3-R4)=0.88$.

In the image capturing optical lens assembly according to the first embodiment, when a curvature radius of the object-side surface of the fourth lens element is R7, and a curvature radius of the image-side surface of the fourth lens element is R8, the following relationship is satisfied:

$R7/R8=-4.28$.

In the image capturing optical lens assembly according to the first embodiment, when the focal length of the image capturing optical lens assembly is f, a focal length of the first lens element is f1, the focal length of the second lens element is f2, and a focal length of the fourth lens element is f4, the following relationships are satisfied:

$f/f1=1.25$;

$f/f2=-0.86$;

$f/f4=2.31$; and $f1/f2=-0.68$.

The detailed optical data of the first embodiment are shown in Table 1 and the aspheric surface data are shown in Table 2 below.

TABLE 1

1st Embodiment
f = 3.44 mm, Fno = 2.40, HFOV = 33.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.017 | | | | |
| 2 | Lens 1 | 1.870710 | (ASP) | 0.679 | Plastic | 1.544 | 55.9 | 2.74 |
| 3 | | −6.425200 | (ASP) | 0.164 | | | | |
| 4 | Lens 2 | −42.540900 | (ASP) | 0.262 | Plastic | 1.634 | 23.8 | −4.02 |
| 5 | | 2.720580 | (ASP) | 0.271 | | | | |
| 6 | Lens 3 | 3.988500 | (ASP) | 0.291 | Plastic | 1.634 | 23.8 | −14.65 |
| 7 | | 2.711230 | (ASP) | 0.111 | | | | |
| 8 | Lens 4 | 3.864500 | (ASP) | 1.311 | Plastic | 1.544 | 55.9 | 1.49 |
| 9 | | −0.903170 | (ASP) | 0.205 | | | | |
| 10 | Lens 5 | −3.327600 | (ASP) | 0.301 | Plastic | 1.535 | 56.3 | −1.33 |
| 11 | | 0.930970 | (ASP) | 0.600 | | | | |
| 12 | IR-Filter | Plano | | 0.300 | Glass | 1.517 | 64.2 | — |
| 13 | | Plano | | 0.099 | | | | |
| 14 | Image | Plano | | — | | | | |

Note:
Reference wavelength (d-line) is 587.6 nm.

TABLE 2

| Aspheric Coefficients | | | | | |
|---|---|---|---|---|---|
| Surface # | 2 | 3 | 4 | 5 | 6 |
| k = | −1.00429E+01 | −2.00000E+01 | 3.00000E+00 | −5.58279E+00 | 2.87778E+00 |
| A4 = | 1.72321E−01 | −5.12951E−02 | −7.62866E−02 | −5.31995E−02 | −1.71858E−01 |
| A6 = | −2.24392E−01 | −8.67835E−02 | −1.30829E−01 | −5.60765E−02 | −1.06035E−01 |
| A8 = | 2.12128E−01 | −9.70630E−03 | 3.32345E−01 | 1.75360E−01 | 3.10811E−01 |
| A10 = | −1.81962E−01 | 7.05506E−02 | −6.83477E−01 | −4.12145E−01 | −3.88738E−01 |

TABLE 2-continued

Aspheric Coefficients

| | | | | | |
|---|---|---|---|---|---|
| A12 = | 3.40733E−02 | −8.40712E−02 | 8.26478E−01 | 3.85900E−01 | 1.70125E−01 |
| A14 = | −2.44759E−02 | 1.78455E−03 | −3.89750E−01 | −1.45054E−01 | −7.99886E−03 |

| Surface # | 7 | 8 | 9 | 10 | 11 |
|---|---|---|---|---|---|
| k = | −8.48978E+00 | −2.63497E+00 | −4.96705E+00 | 8.42110E−01 | −7.00900E+00 |
| A4 = | −1.51823E−01 | −7.03184E−02 | −7.44926E−02 | −3.45787E−02 | −8.74684E−02 |
| A6 = | −6.62594E−02 | 4.72475E−02 | 1.27054E−01 | −4.89525E−02 | 3.30658E−02 |
| A8 = | 1.29561E−01 | −2.10209E−01 | −1.28219E−01 | 3.42083E−02 | −1.08876E−02 |
| A10 = | −6.54373E−02 | 3.04954E−01 | 6.61213E−02 | −7.87880E−03 | 1.99356E−03 |
| A12 = | 4.65082E−02 | −1.72037E−01 | −1.69403E−02 | −1.75314E−03 | −2.30355E−04 |
| A14 = | −9.91422E−03 | 3.43317E−02 | 1.42253E−03 | 8.46837E−04 | 2.06918E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 also applies to the Tables for the rest of embodiments, and thus an explanation in this regard will not be provided again.

Figure 3:
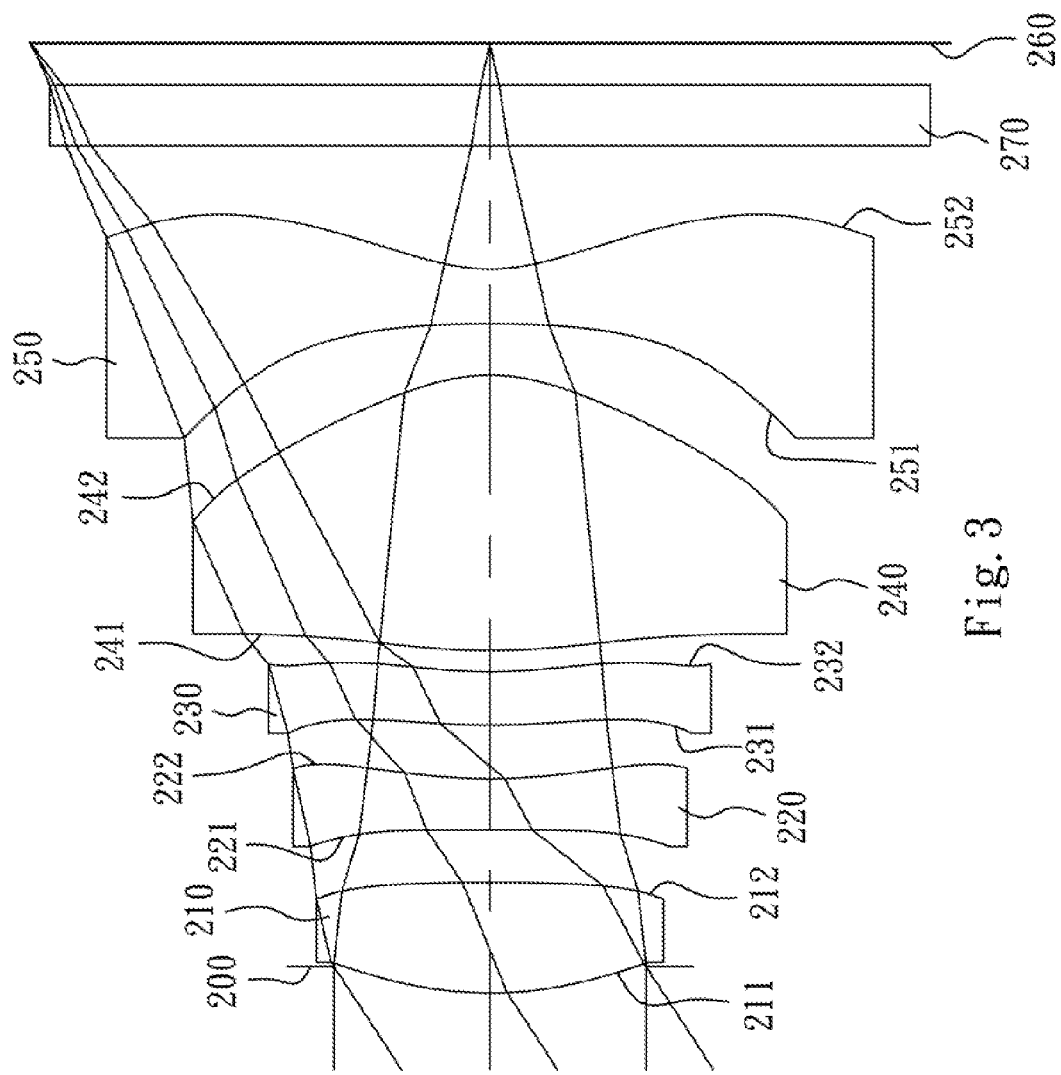
FIG. 3 is a schematic view of an image capturing optical lens assembly according to the second embodiment of the present disclosure.
Figure 4:
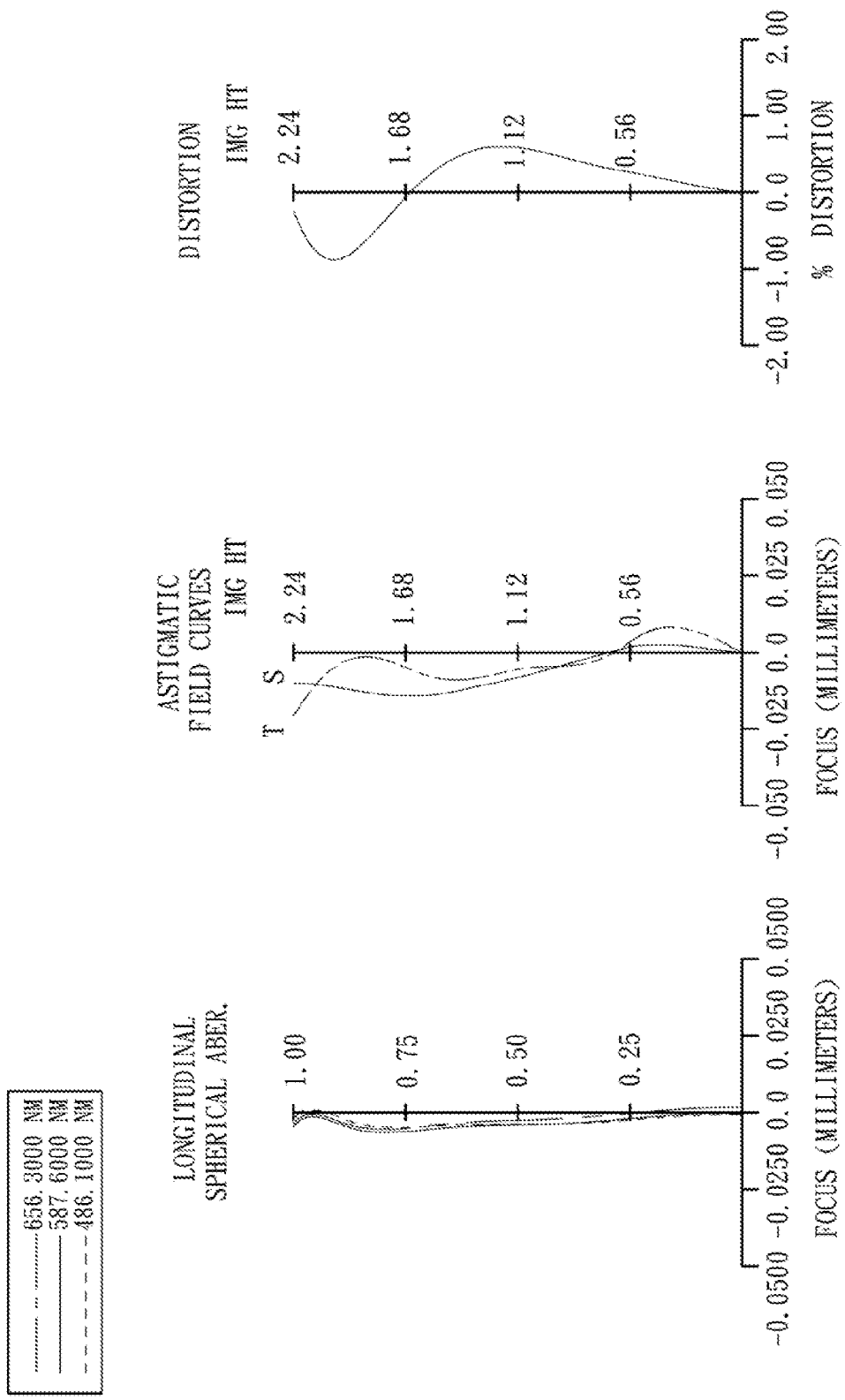
FIG. 4 shows spherical aberration curves, astigmatic field curves and a distortion curve of the image capturing optical lens assembly according to the second embodiment.

FIG. 3 is a schematic view of an image capturing optical lens assembly according to the second embodiment of the present disclosure. FIG. 4 shows spherical aberration curves, astigmatic field curves and a distortion curve of the image capturing optical lens assembly according to the second embodiment. In FIG. 3, the image capturing optical lens assembly includes, in order from an object side to an image side, an aperture stop 200, the first lens element 210, the second lens element 220, the third lens element 230, the fourth lens element 240, the fifth lens element 250, an IR cut filter 270 and an image plane 260.

The first lens element 210 with positive refractive power has a convex object-side surface 211 and a convex image-side surface 212, and is made of plastic material. The object-side surface 211 and the image-side surface 212 of the first lens element 210 are aspheric.

The second lens element 220 with negative refractive power has a concave object-side surface 221 and a concave image-side surface 222, and is made of plastic material. The object-side surface 221 and the image-side surface 222 of the second lens element 220 are aspheric.

The third lens element 230 with negative refractive power has a convex object-side surface 231 and a concave image-side surface 232, and is made of plastic material. The object-side surface 231 and the image-side surface 232 of the third lens element 230 are aspheric.

The fourth lens element 240 with positive refractive power has a convex object-side surface 241 and a convex image-side surface 242, and is made of plastic material. The object-side surface 241 and the image-side surface 242 of the fourth lens element 240 are aspheric.

The fifth lens element 250 with negative refractive power has a concave object-side surface 251 and a concave image-side surface 252, and is made of plastic material. The object-side surface 251 and the image-side surface 252 of the fifth lens element 250 are aspheric. Furthermore, the fifth lens element 250 has inflection points formed on the object-side surface 251 and the image-side surface 252 thereof.

The IR cut filter 270 is located between the fifth lens element 250 and the image plane 260, and will not affect the focal length of the image capturing optical lens assembly.

The equation of the aspheric surface profiles of the above lens elements of the second embodiment is the same as that of the first embodiment, and will not be stated herein again.

The detailed optical data of the second embodiment are shown in Table 3 and the aspheric surface data are shown in Table 4 below.

TABLE 3

2nd Embodiment
f = 3.42 mm, Fno = 2.25, HFOV = 33.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.128 | | | | |
| 2 | Lens 1 | 1.890050 | (ASP) | 0.541 | Plastic | 1.544 | 55.9 | 3.09 |
| 3 | | −13.716700 | (ASP) | 0.254 | | | | |
| 4 | Lens 2 | −87.279400 | (ASP) | 0.252 | Plastic | 1.640 | 23.3 | −4.21 |
| 5 | | 2.785030 | (ASP) | 0.258 | | | | |
| 6 | Lens 3 | 3.664800 | (ASP) | 0.260 | Plastic | 1.640 | 23.3 | −13.64 |
| 7 | | 2.509250 | (ASP) | 0.106 | | | | |
| 8 | Lens 4 | 3.282300 | (ASP) | 1.342 | Plastic | 1.535 | 56.3 | 1.46 |
| 9 | | −0.878100 | (ASP) | 0.248 | | | | |
| 10 | Lens 5 | −5.466200 | (ASP) | 0.266 | Plastic | 1.535 | 56.3 | −1.39 |
| 11 | | 0.872200 | (ASP) | 0.600 | | | | |
| 12 | IR-Filter | Plano | | 0.300 | Glass | 1.517 | 64.2 | — |
| 13 | | Plano | | 0.201 | | | | |
| 14 | Image | Plano | | — | | | | |

Note:
Reference wavelength (d-line) is 587.6 nm.

TABLE 4

Aspheric Coefficients

| Surface # | 2 | 3 | 4 | 5 | 6 |
|---|---|---|---|---|---|
| k = | −1.01436E+01 | −2.00000E+01 | −2.00000E+01 | −5.31024E+00 | 2.31008E+00 |
| A4 = | 1.73069E−01 | −3.96180E−02 | −8.89532E−02 | −5.45072E−02 | −1.78549E−01 |
| A6 = | −2.24331E−01 | −7.53668E−02 | −1.26097E−01 | −6.51947E−02 | −8.76471E−02 |
| A8 = | 2.17620E−01 | −3.00099E−02 | 2.97610E−01 | 1.74491E−01 | 3.11309E−01 |
| A10 = | −2.03439E−01 | 5.31381E−02 | −6.76351E−01 | −4.24951E−01 | −3.94192E−01 |
| A12 = | 3.40733E−02 | −8.40712E−02 | 8.26478E−01 | 3.86413E−01 | 1.64844E−01 |
| A14 = | −2.44759E−02 | 1.78455E−03 | −3.89750E−01 | −1.45054E−01 | −1.12642E−02 |

| Surface # | 7 | 8 | 9 | 10 | 11 |
|---|---|---|---|---|---|
| k = | −1.10610E+01 | −4.41832E+00 | −4.70049E+00 | 2.99993E+00 | −6.06930E+00 |
| A4 = | −1.53676E−01 | −7.32151E−02 | −7.96726E−02 | −5.21975E−02 | −9.26162E−02 |
| A6 = | −6.67232E−02 | 4.71782E−02 | 1.26542E−01 | −4.71388E−02 | 3.47504E−02 |
| A8 = | 1.27714E−01 | −2.09386E−01 | −1.27743E−01 | 3.47568E−02 | −1.08258E−02 |
| A10 = | −6.72194E−02 | 3.05719E−01 | 6.62485E−02 | −7.64285E−03 | 1.93406E−03 |
| A12 = | 4.55893E−02 | −1.71624E−01 | −1.69256E−02 | −1.68544E−03 | −2.31866E−04 |
| A14 = | −8.68850E−03 | 3.35208E−02 | 1.34786E−03 | 7.67680E−04 | 2.42015E−05 |

In the image capturing optical lens assembly according to the second embodiment, the definitions of f, Fno, HFOV, V1, V2, R3, R4, R7, R8, f1, f2 and f4 are the same as those stated in the first embodiment with corresponding values for the second embodiment. Moreover, these parameters can be calculated from Table 3 and Table 4 as the following values and satisfy the following relationships:

| | |
|---|---|
| f (mm) | 3.42 |
| Fno | 2.25 |
| HFOV (deg.) | 33.3 |
| V1 − V2 | 32.6 |
| (R3 + R4)/(R3 − R4) | 0.94 |
| R7/R8 | −3.74 |
| f/f1 | 1.11 |
| f/f2 | −0.81 |
| f/f4 | 2.34 |
| f1/f2 | −0.73 |

Figure 5:
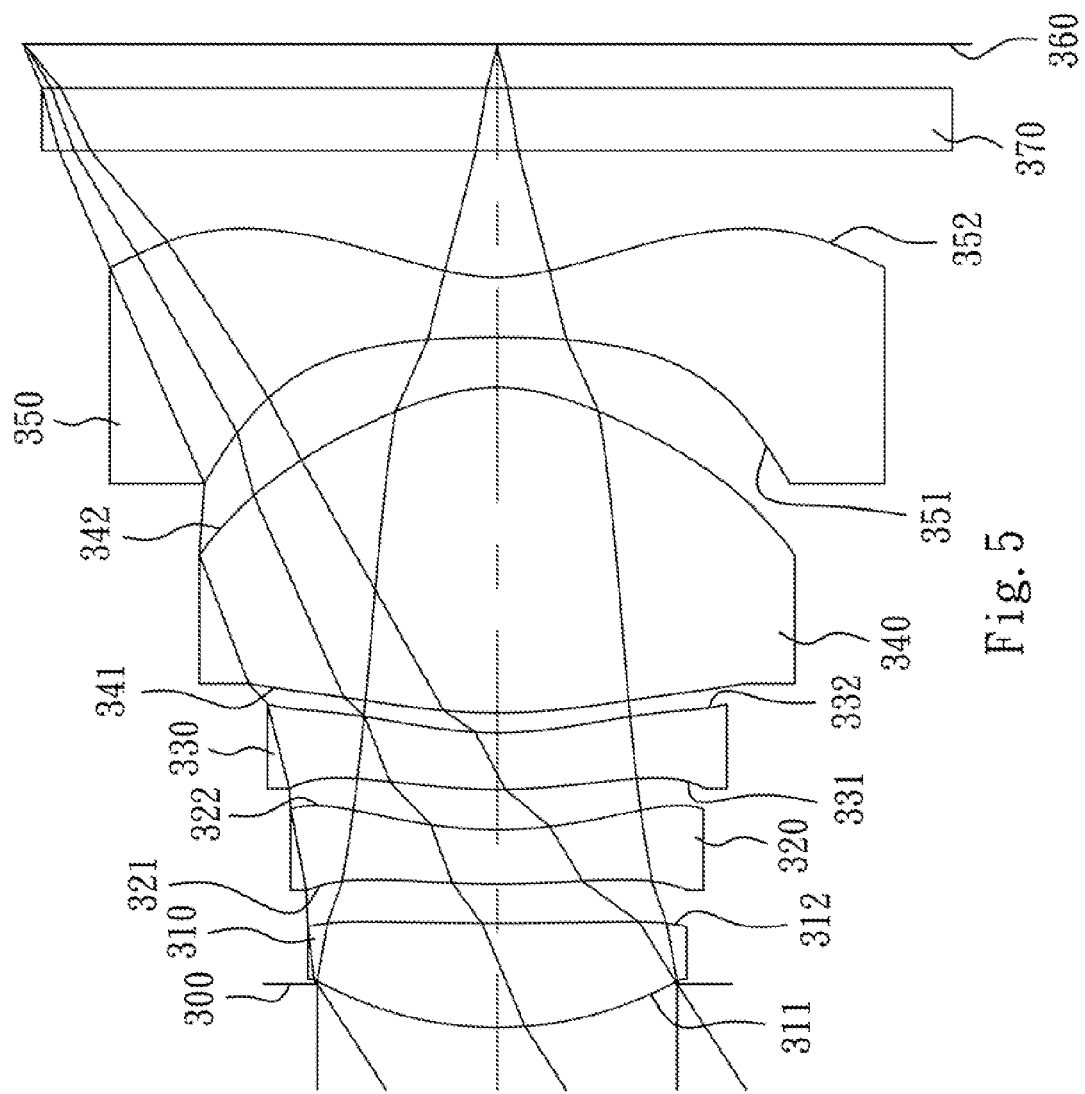
FIG. 5 is a schematic view of an image capturing optical lens assembly according to the third embodiment of the present disclosure.
Figure 6:
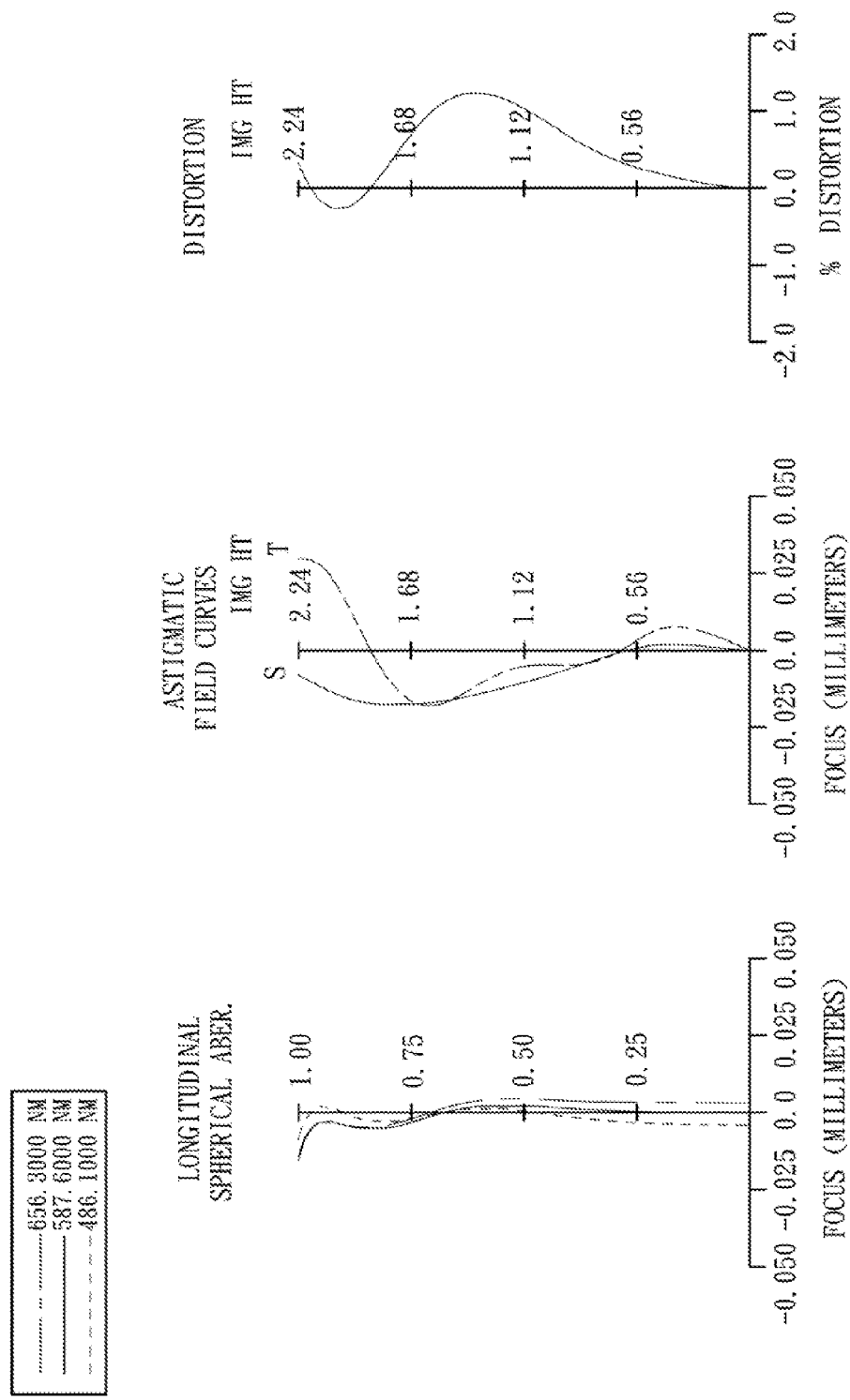
FIG. 6 shows spherical aberration curves, astigmatic field curves and a distortion curve of the image capturing optical lens assembly according to the third embodiment.

FIG. 5 is a schematic view of an image capturing optical lens assembly according to the third embodiment of the present disclosure. FIG. 6 shows spherical aberration curves, astigmatic field curves and a distortion curve of the image capturing optical lens assembly according to the third embodiment. In FIG. 5, the image capturing optical lens assembly includes, in order from an object side to an image side, an aperture stop 300, the first lens element 310, the second lens element 320, the third lens element 330, the fourth lens element 340, the fifth lens element 350, an IR cut filter 370 and an image plane 360.

The first lens element 310 with positive refractive power has a convex object-side surface 311 and a concave image-side surface 312, and is made of plastic material. The object-side surface 311 and the image-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric.

The third lens element 330 with negative refractive power has a convex object-side surface 331 and a concave image-side surface 332, and is made of plastic material. The object-side surface 331 and the image-side surface 332 of the third lens element 330 are aspheric.

The fourth lens element 340 with positive refractive power has a convex object-side surface 341 and a convex image-side surface 342, and is made of plastic material. The object-side surface 341 and the image-side surface 342 of the fourth lens element 340 are aspheric.

The fifth lens element 350 with negative refractive power has a concave object-side surface 351 and a concave image-side surface 352, and is made of plastic material. The object-side surface 351 and the image-side surface 352 of the fifth lens element 350 are aspheric. Furthermore, the fifth lens element 350 has inflection points formed on the object-side surface 351 and the image-side surface 352 thereof.

The IR cut filter 370 is located between the fifth lens element 350 and the image plane 360, and will not affect the focal length of the image capturing optical lens assembly.

The equation of the aspheric surface profiles of the above lens elements of the third embodiment is the same as that of the first embodiment, and will not be stated herein again.

The detailed optical data of the third embodiment are shown in Table 5 and the aspheric surface data are shown in Table 6 below.

TABLE 5

3rd Embodiment
f = 3.41 mm, Fno = 2.00, HFOV = 33.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.206 | | | | |
| 2 | Lens 1 | 1.767110 (ASP) | 0.497 | Plastic | 1.544 | 55.9 | 3.60 |
| 3 | | 16.127600 (ASP) | 0.186 | | | | |
| 4 | Lens 2 | 4.798200 (ASP) | 0.255 | Plastic | 1.640 | 23.3 | −5.53 |
| 5 | | 1.995000 (ASP) | 0.194 | | | | |

TABLE 5-continued

3rd Embodiment
f = 3.41 mm, Fno = 2.00, HFOV = 33.2 deg.

| Surface # | | Curvature Radius | | Thickness | Material | Index | Abbe # | Focal length |
|---|---|---|---|---|---|---|---|---|
| 6 | Lens 3 | 2.643260 | (ASP) | 0.266 | Plastic | 1.640 | 23.3 | −9.83 |
| 7 | | 1.788090 | (ASP) | 0.095 | | | | |
| 8 | Lens 4 | 2.851690 | (ASP) | 1.546 | Plastic | 1.535 | 56.3 | 1.46 |
| 9 | | −0.868420 | (ASP) | 0.236 | | | | |
| 10 | Lens 5 | −4.756900 | (ASP) | 0.285 | Plastic | 1.535 | 56.3 | −1.41 |
| 11 | | 0.911080 | (ASP) | 0.600 | | | | |
| 12 | IR-Filter | Plano | | 0.300 | Glass | 1.517 | 64.2 | — |
| 13 | | Plano | | 0.207 | | | | |
| 14 | Image | Plano | | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | −8.99146E+00 | −1.00000E+00 | −1.00000E+00 | −3.52967E+00 | 1.96164E+00 |
| A4 = | 2.07463E−01 | −2.90378E−02 | −1.28987E−01 | −5.30984E−02 | −1.98194E−01 |
| A6 = | −1.95226E−01 | −7.05418E−03 | −7.93644E−02 | −7.24302E−02 | −4.86147E−02 |
| A8 = | 2.04221E−01 | −4.38447E−02 | 2.62577E−01 | 1.91323E−01 | 3.02218E−01 |
| A10 = | −1.31534E−01 | 6.47380E−02 | −6.96410E−01 | −4.24136E−01 | −4.16169E−01 |
| A12 = | 3.40733E−02 | −8.40712E−02 | 8.26478E−01 | 3.70307E−01 | 1.51188E−01 |
| A14 = | −2.44759E−02 | 1.78456E−03 | −3.89750E−01 | −1.45054E−01 | −1.12642E−02 |

| Surface # | 7 | 8 | 9 | 10 | 11 |
|---|---|---|---|---|---|
| k = | −7.45875E+00 | −7.66386E−01 | −4.61622E+00 | 9.04069E−01 | −6.69453E+00 |
| A4 = | −1.03896E−01 | −6.45247E−02 | −1.04995E−01 | −6.95815E−02 | −9.24872E−02 |
| A6 = | −5.98577E−02 | 3.76553E−02 | 1.26070E−01 | −5.68426E−02 | 3.13517E−02 |
| A8 = | 1.16410E−01 | −2.10023E−01 | −1.29933E−01 | 2.77408E−02 | −1.12843E−02 |
| A10 = | −7.51796E−02 | 3.07250E−01 | 6.59514E−02 | −1.08167E−02 | 2.04843E−03 |
| A12 = | 4.55399E−02 | −1.69500E−01 | −1.67417E−02 | −1.92143E−03 | −1.67440E−04 |
| A14 = | −9.59723E−03 | 3.27831E−02 | 1.50576E−03 | 1.87551E−03 | 1.61338E−05 |

In the image capturing optical lens assembly according to the third embodiment, the definitions of f, Fno, HFOV, V1, V2, R3, R4, R7, R8, f1, f2 and f4 are the same as those stated in the first embodiment with corresponding values for the third embodiment. Moreover, these parameters can be calculated from Table 5 and Table 6 as the following values and satisfy the following relationships:

| | |
|---|---|
| f (mm) | 3.41 |
| Fno | 2.00 |
| HFOV (deg.) | 33.2 |
| V1 − V2 | 32.6 |
| (R3 + R4)/(R3 − R4) | 2.42 |
| R7/R8 | −3.28 |
| f/f1 | 0.95 |
| f/f2 | −0.62 |
| f/f4 | 2.34 |
| f1/f2 | −0.65 |

Figure 7:
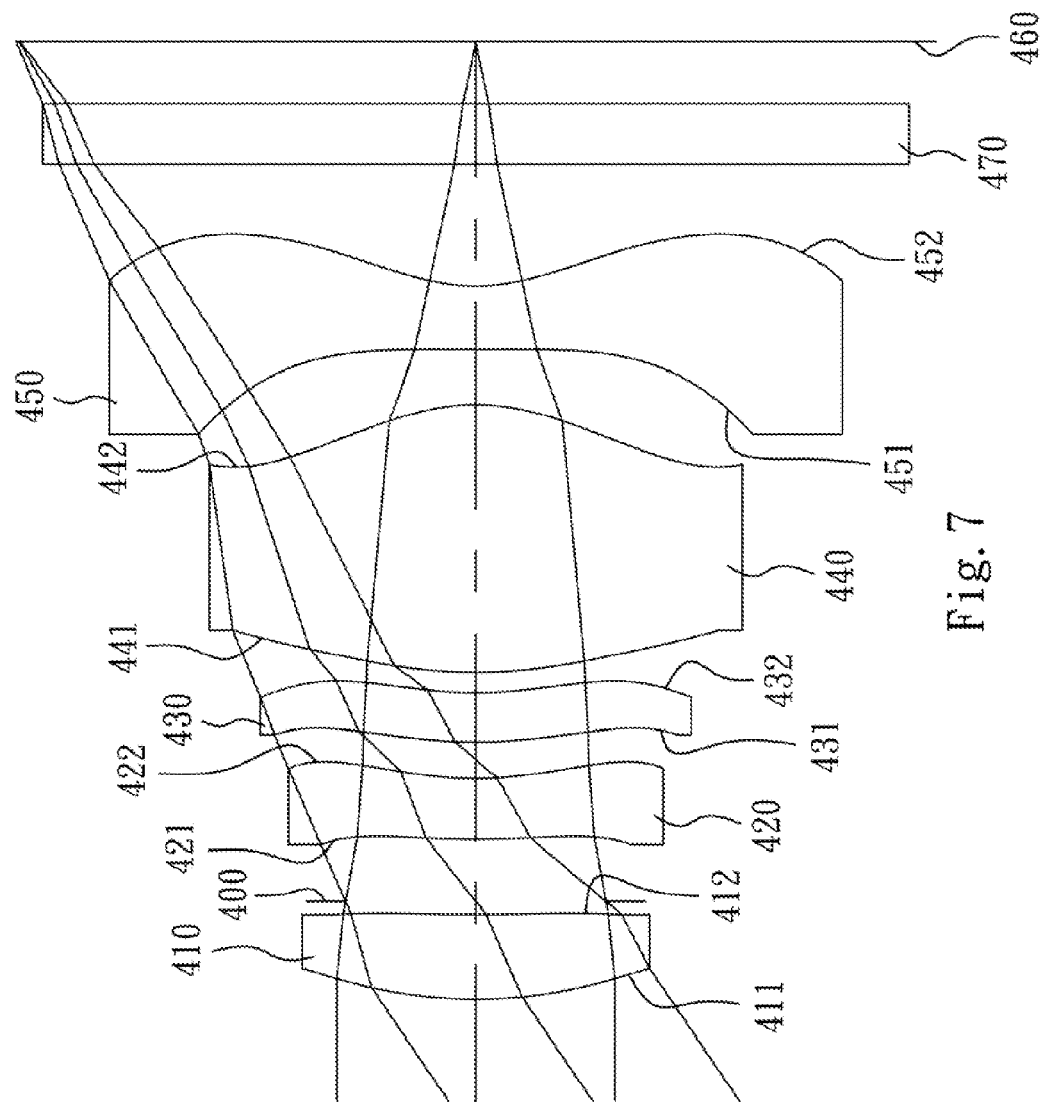
FIG. 7 is a schematic view of an image capturing optical lens assembly according to the fourth embodiment of the present disclosure.
Figure 8:
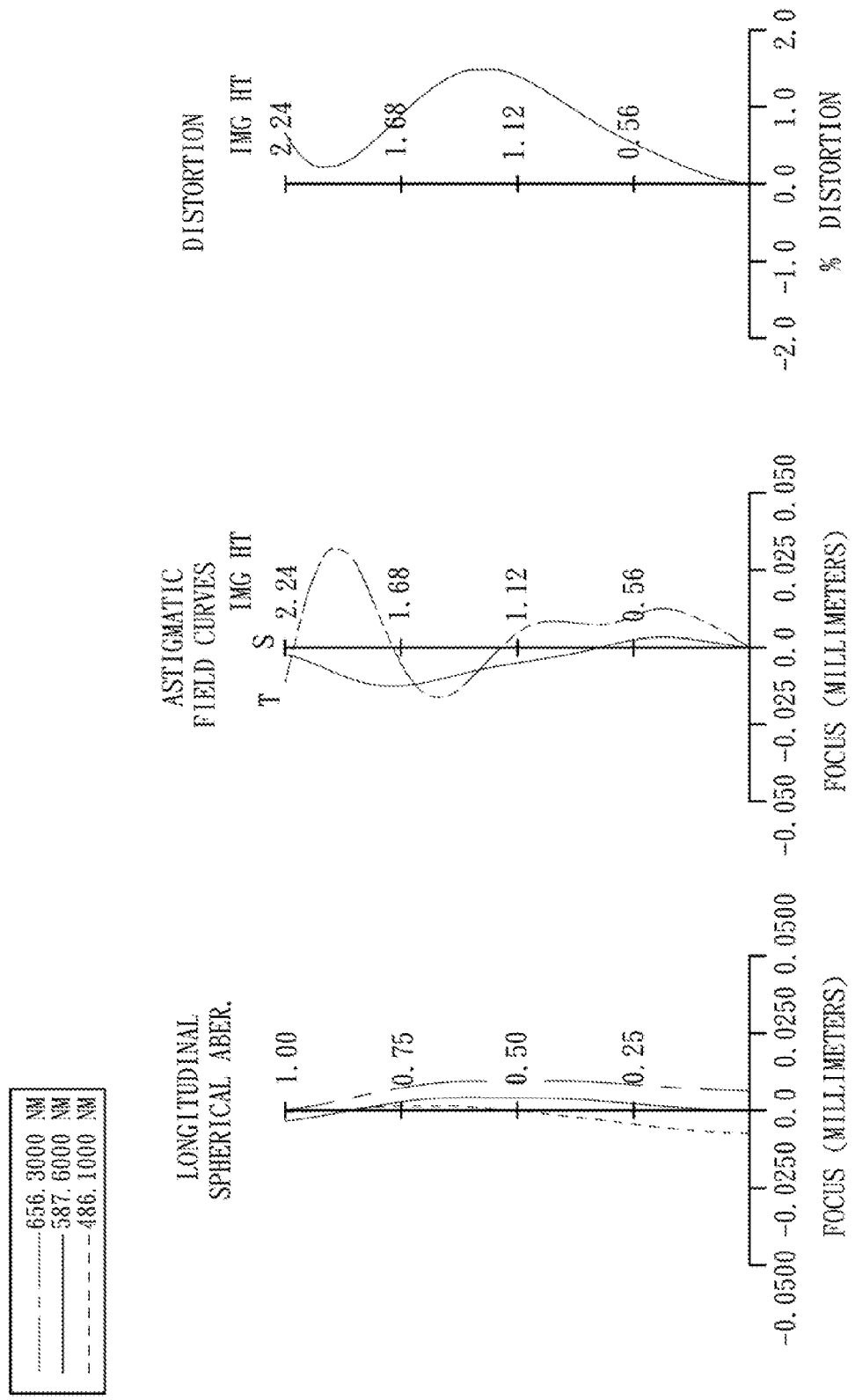
FIG. 8 shows spherical aberration curves, astigmatic field curves and a distortion curve of the image capturing optical lens assembly according to the fourth embodiment.

FIG. 7 is a schematic view of an image capturing optical lens assembly according to the fourth embodiment of the present disclosure. FIG. 8 shows spherical aberration curves, astigmatic field curves and a distortion curve of the image capturing optical lens assembly according to the fourth embodiment. In FIG. 7, the image capturing optical lens assembly includes, in order from an object side to an image side, the first lens element 410, an aperture stop 400, the second lens element 420, the third lens element 430, the fourth lens element 440, the fifth lens element 450, an IR cut filter 470 and an image plane 460.

The first lens element 410 with positive refractive power has a convex object-side surface 411 and a concave image-side surface 412, and is made of plastic material. The object-side surface 411 and the image-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric.

The third lens element 430 with negative refractive power has a convex object-side surface 431 and a concave image-side surface 432, and is made of plastic material. The object-side surface 431 and the image-side surface 432 of the third lens element 430 are aspheric.

The fourth lens element 440 with positive refractive power has a convex object-side surface 441 and a convex image-side surface 442, and is made of plastic material. The object-side surface 441 and the image-side surface 442 of the fourth lens element 440 are aspheric.

The fifth lens element 450 with negative refractive power has a convex object-side surface 451 and a concave image-side surface 452, and is made of plastic material. The object-side surface 451 and the image-side surface 452 of the fifth lens element 450 are aspheric. Furthermore, the fifth lens element 450 has inflection points formed on the object-side surface 451 and the image-side surface 452 thereof.

The IR cut filter 470 is located between the fifth lens element 450 and the image plane 460, and will not affect the focal length of the image capturing optical lens assembly.

The equation of the aspheric surface profiles of the above lens elements of the fourth embodiment is the same as that of the first embodiment, and will not be stated herein again.

The detailed optical data of the fourth embodiment are shown in Table 7 and the aspheric surface data are shown in Table 8 below.

| f (mm) | 3.27 |
|---|---|
| Fno | 2.40 |
| HFOV (deg.) | 34.2 |
| V1 − V2 | 34.5 |
| (R3 + R4)/(R3 − R4) | 2.61 |
| R7/R8 | −2.42 |
| f/f1 | 0.68 |
| f/f2 | −0.65 |
| f/f4 | 2.19 |
| f1/f2 | −0.95 |

TABLE 7

4th Embodiment
f = 3.27 mm, Fno = 2.40, HFOV = 34.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.315090 (ASP) | 0.418 | Plastic | 1.544 | 55.9 | 4.83 |
| 2 | | 18.277700 (ASP) | 0.063 | | | | |
| 3 | Ape. Stop | Plano | 0.305 | | | | |
| 4 | Lens 2 | 3.882200 (ASP) | 0.299 | Plastic | 1.650 | 21.4 | −5.07 |
| 5 | | 1.728700 (ASP) | 0.180 | | | | |
| 6 | Lens 3 | 2.288410 (ASP) | 0.240 | Plastic | 1.544 | 55.9 | −29.90 |
| 7 | | 1.932110 (ASP) | 0.100 | | | | |
| 8 | Lens 4 | 2.333700 (ASP) | 1.317 | Plastic | 1.530 | 55.8 | 1.49 |
| 9 | | −0.963940 (ASP) | 0.269 | | | | |
| 10 | Lens 5 | 93.089100 (ASP) | 0.310 | Plastic | 1.544 | 55.9 | −1.60 |
| 11 | | 0.860020 (ASP) | 0.600 | | | | |
| 12 | IR-Filter | Plano | 0.300 | Glass | 1.517 | 64.2 | — |
| 13 | | Plano | 0.303 | | | | |
| 14 | Image | Plano | — | | | | |

Note:
Reference wavelength (d-line) is 587.6 nm.

TABLE 8

Aspheric Coefficients

| Surface # | 1 | 2 | 4 | 5 | 6 |
|---|---|---|---|---|---|
| k = | −1.84195E+01 | −1.00000E+00 | −1.00000E+00 | −6.98405E+00 | 1.57036E+00 |
| A4 = | 1.76703E−01 | −4.81980E−02 | −2.66361E−01 | −1.10667E−01 | −2.28317E−01 |
| A6 = | −2.22132E−01 | 1.26292E−03 | −6.50718E−02 | −1.12076E−01 | 6.67211E−03 |
| A8 = | 2.29622E−01 | −5.98842E−02 | 2.60842E−01 | 2.45926E−01 | 2.61237E−01 |
| A10 = | −1.67242E−01 | 5.09115E−02 | −7.86569E−01 | −4.82350E−01 | −4.71297E−01 |
| A12 = | 3.40727E−02 | −8.40715E−02 | 8.26478E−01 | 3.19298E−01 | 1.80655E−01 |
| A14 = | −2.44761E−02 | 1.78437E−03 | −3.89750E−01 | −7.00729E−02 | 2.69011E−02 |

| Surface # | 7 | 8 | 9 | 10 | 11 |
|---|---|---|---|---|---|
| k = | −1.01148E+01 | −3.45473E−01 | −5.01924E+00 | −2.00000E+01 | −4.92820E+00 |
| A4 = | −1.57501E−01 | −6.10272E−02 | −5.06950E−02 | −1.23976E−01 | −1.20863E−01 |
| A6 = | −9.64090E−02 | 3.97400E−02 | 1.52332E−01 | −3.99877E−02 | 4.13124E−02 |
| A8 = | 1.07003E−01 | −2.11002E−01 | −1.23497E−01 | 3.87206E−02 | −1.18226E−02 |
| A10 = | −7.61993E−02 | 3.06526E−01 | 6.67318E−02 | −7.44134E−03 | 1.85861E−03 |
| A12 = | 4.13872E−02 | −1.70593E−01 | −1.67279E−02 | −2.77191E−03 | −2.11589E−04 |
| A14 = | −1.18053E−03 | 3.32587E−02 | 1.03629E−03 | 9.52056E−04 | 1.60461E−05 |

Figure 9:
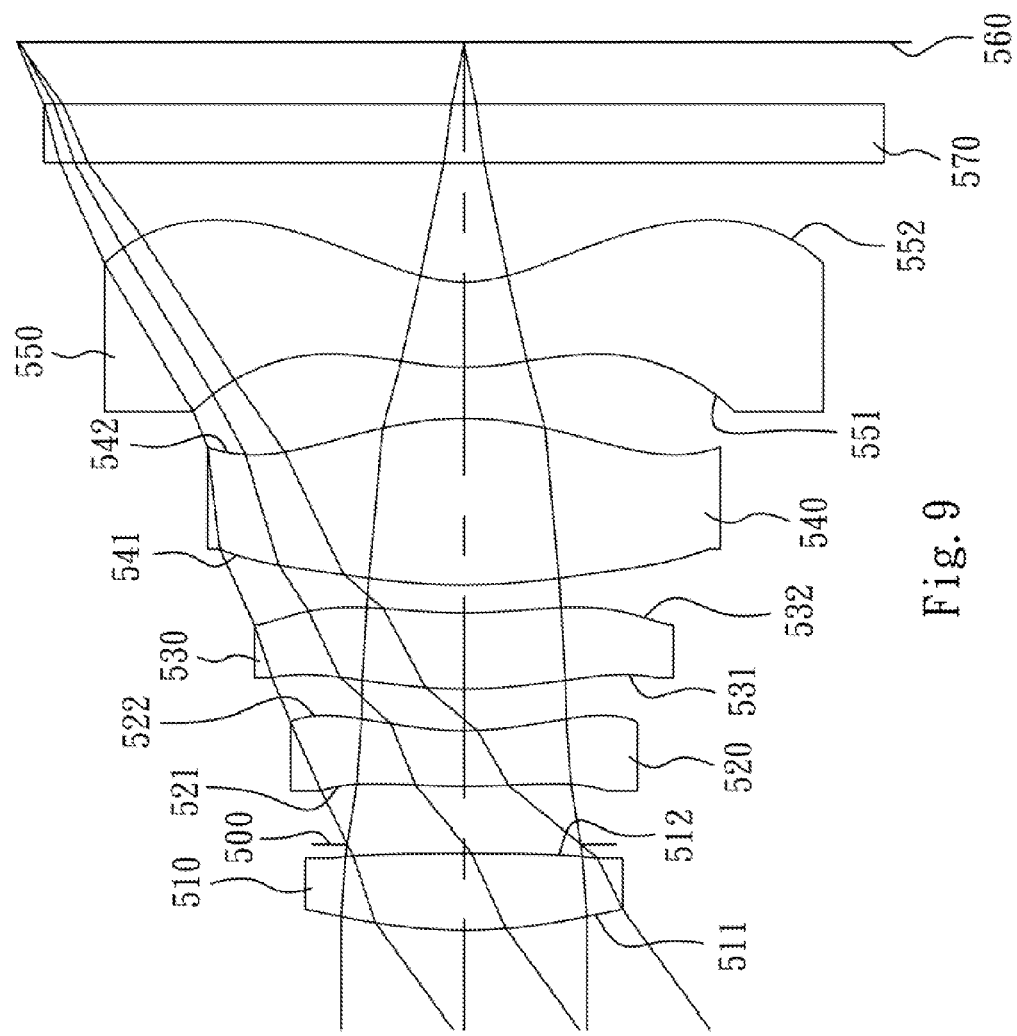
FIG. 9 is a schematic view of an image capturing optical lens assembly according to the fifth embodiment of the present disclosure.
Figure 10:
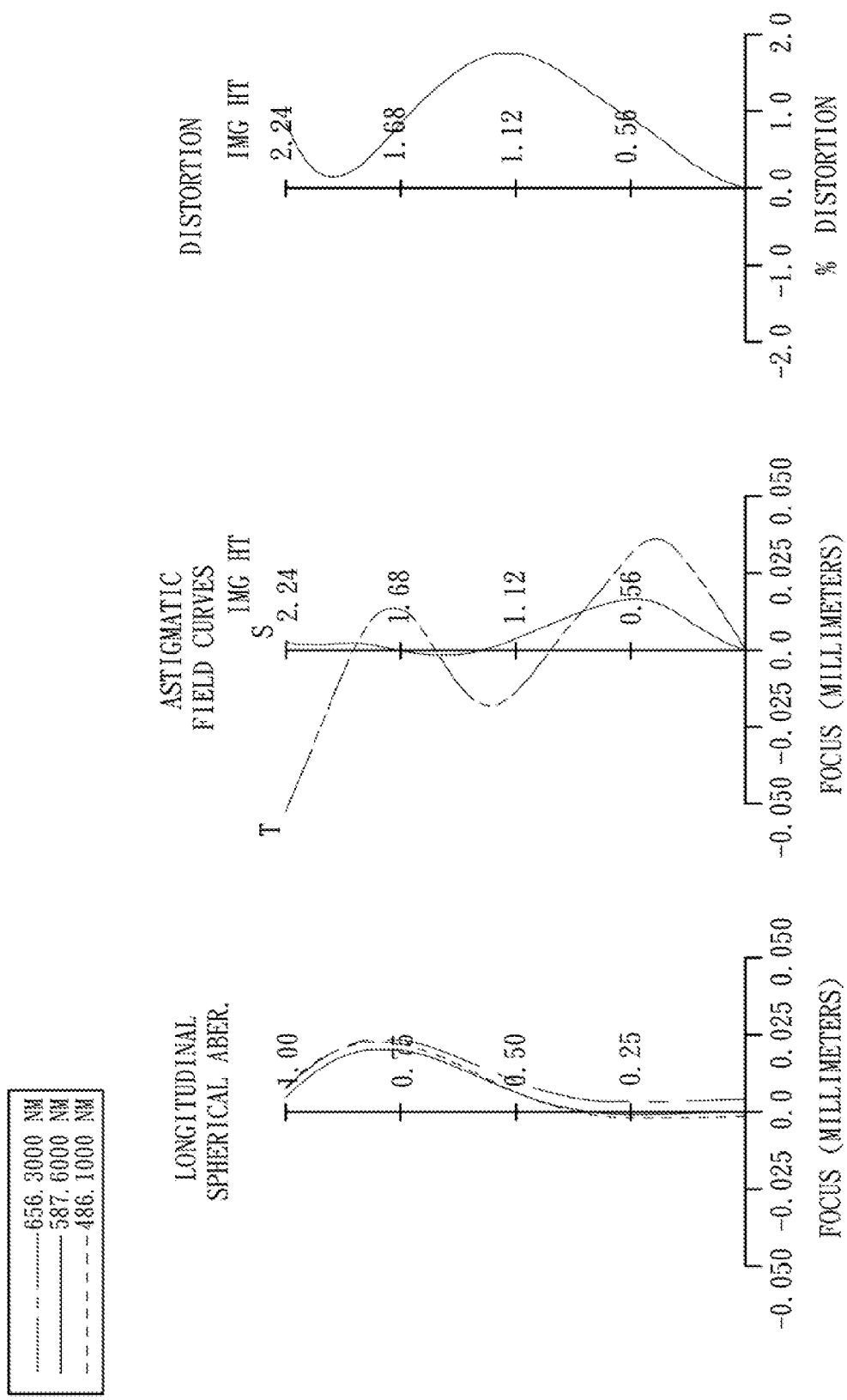
FIG. 10 shows spherical aberration curves, astigmatic field curves and a distortion curve of the image capturing optical lens assembly according to the fifth embodiment.

In the image capturing optical lens assembly according to the fourth embodiment, the definitions of f, Fno, HFOV, V1, V2, R3, R4, R7, R8, f1, f2 and f4 are the same as those stated in the first embodiment with corresponding values for the fourth embodiment. Moreover, these parameters can be calculated from Table 7 and Table 8 as the following values and satisfy the following relationships:

FIG. 9 is a schematic view of an image capturing optical lens assembly according to the fifth embodiment of the present disclosure. FIG. 10 shows to spherical aberration curves, astigmatic field curves and a distortion curve of the image capturing optical lens assembly according to the fifth embodiment. In FIG. 9, the image capturing optical lens assembly includes, in order from an object side to an image side, the first lens element 510, an aperture stop 500, the second lens element 520, the third lens element 530, the fourth lens element 540, the fifth lens element 550, an IR cut filter 570 and an image plane 560.

The first lens element 510 with positive refractive power has a convex object-side surface 511 and a convex image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with positive refractive power has a convex object-side surface 531 and a concave image-side surface 532, and is made of plastic material. The object-side surface 531 and the image-side surface 532 of the third lens element 530 are aspheric.

The fourth lens element 540 with positive refractive power has a convex object-side surface 541 and a convex image-side surface 542, and is made of plastic material. The object-side surface 541 and the image-side surface 542 of the fourth lens element 540 are aspheric.

The fifth lens element 550 with negative refractive power has a convex object-side surface 551 and a concave image-side surface 552, and is made of plastic material. The object-side surface 551 and the image-side surface 552 of the fifth lens element 550 are aspheric. Furthermore, the fifth lens element 550 has inflection points formed on the object-side surface 551 and the image-side surface 552 thereof.

The IR cut filter 570 is located between the fifth lens element 550 and the image plane 560, and will not affect the focal length of the image capturing optical lens assembly.

The equation of the aspheric surface profiles of the above lens elements of the fifth embodiment is the same as that of the first embodiment, and will not be stated herein again.

The detailed optical data of the fifth embodiment are shown in Table 9 and the aspheric surface data are shown in Table 10 below.

TABLE 9

5th Embodiment
f = 3.03 mm, Fno = 2.45, HFOV = 36.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.697990 | (ASP) | 0.388 | Plastic | 1.544 | 55.9 | 4.58 |
| 2 | | −30.921500 | (ASP) | 0.047 | | | | |
| 3 | Ape. Stop | Plano | | 0.290 | | | | |
| 4 | Lens 2 | 4.117800 | (ASP) | 0.283 | Plastic | 1.650 | 21.4 | −4.34 |
| 5 | | 1.628390 | (ASP) | 0.207 | | | | |
| 6 | Lens 3 | 2.330240 | (ASP) | 0.387 | Plastic | 1.544 | 55.9 | 18.56 |
| 7 | | 2.851690 | (ASP) | 0.138 | | | | |
| 8 | Lens 4 | 3.107300 | (ASP) | 0.839 | Plastic | 1.530 | 55.8 | 2.17 |
| 9 | | −1.658100 | (ASP) | 0.262 | | | | |
| 10 | Lens 5 | 1.480970 | (ASP) | 0.427 | Plastic | 1.544 | 55.9 | −3.31 |
| 11 | | 0.730140 | (ASP) | 0.600 | | | | |
| 12 | IR-Filter | Plano | | 0.300 | Glass | 1.517 | 64.2 | — |
| 13 | | Plano | | 0.309 | | | | |
| 14 | Image | Plano | | — | | | | |

Note:
Reference wavelength (d-line) is 587.6 nm.

TABLE 10

Aspheric Coefficients

| Surface # | 1 | 2 | 4 | 5 | 6 |
|---|---|---|---|---|---|
| k = | −2.00000E+01 | −1.00000E+00 | −1.39551E+01 | −1.07338E+01 | 1.99784E+00 |
| A4 = | 1.14693E−01 | −6.57789E−02 | −3.04895E−01 | −1.06573E−01 | −2.11858E−01 |
| A6 = | −1.93884E−01 | 1.26154E−02 | 4.57847E−02 | −1.13632E−01 | 6.49751E−03 |
| A8 = | 2.52435E−01 | −3.70960E−02 | 2.79048E−01 | 2.25066E−01 | 2.44403E−01 |
| A10 = | −2.49278E−01 | −5.16109E−02 | −1.00473E+00 | −4.98317E−01 | −4.70846E−01 |
| A12 = | 3.40703E−02 | −8.40709E−02 | 8.26479E−01 | 3.03742E−01 | 2.03258E−01 |
| A14 = | −2.44790E−02 | 1.78476E−03 | −3.89750E−01 | −6.81911E−02 | 2.27958E−02 |

| Surface # | 7 | 8 | 9 | 10 | 11 |
|---|---|---|---|---|---|
| k = | −2.00000E+01 | 1.55630E−01 | −3.84187E+00 | −1.34467E+01 | −3.61967E+00 |
| A4 = | −1.86483E−01 | −6.03089E−02 | −1.23431E−02 | −2.22038E−01 | −1.60301E−01 |
| A6 = | −8.30706E−02 | 3.76148E−02 | 1.56218E−01 | 1.35161E−02 | 6.69638E−02 |
| A8 = | 1.18486E−01 | −2.05615E−01 | −1.25060E−01 | 4.37304E−02 | −1.87737E−02 |
| A10 = | −6.83366E−02 | 3.11609E−01 | 6.52359E−02 | −1.30929E−02 | 2.03540E−03 |
| A12 = | 4.33975E−02 | −1.69254E−01 | −1.77332E−02 | −4.77009E−03 | 5.76122E−05 |
| A14 = | 4.14685E−05 | 3.14319E−02 | 1.45742E−03 | 1.74076E−03 | −2.24098E−05 |

In the image capturing optical lens assembly according to the fifth embodiment, the definitions of f, Fno, HFOV, V1, V2, R3, R4, R7, R8, f1, f2 and f4 are the same as those stated in the first embodiment with corresponding values for the fifth embodiment. Moreover, these parameters can be calculated from Table 9 and Table 10 as the following values and satisfy the following relationships:

| | |
|---|---|
| f (mm) | 3.03 |
| Fno | 2.45 |
| HFOV (deg.) | 36.1 |
| V1 − V2 | 34.5 |
| (R3 + R4)/(R3 − R4) | 2.31 |
| R7/R8 | −1.87 |
| f/f1 | 0.66 |
| f/f2 | −0.70 |
| f/f4 | 1.40 |
| f1/f2 | −1.06 |

Figure 11:
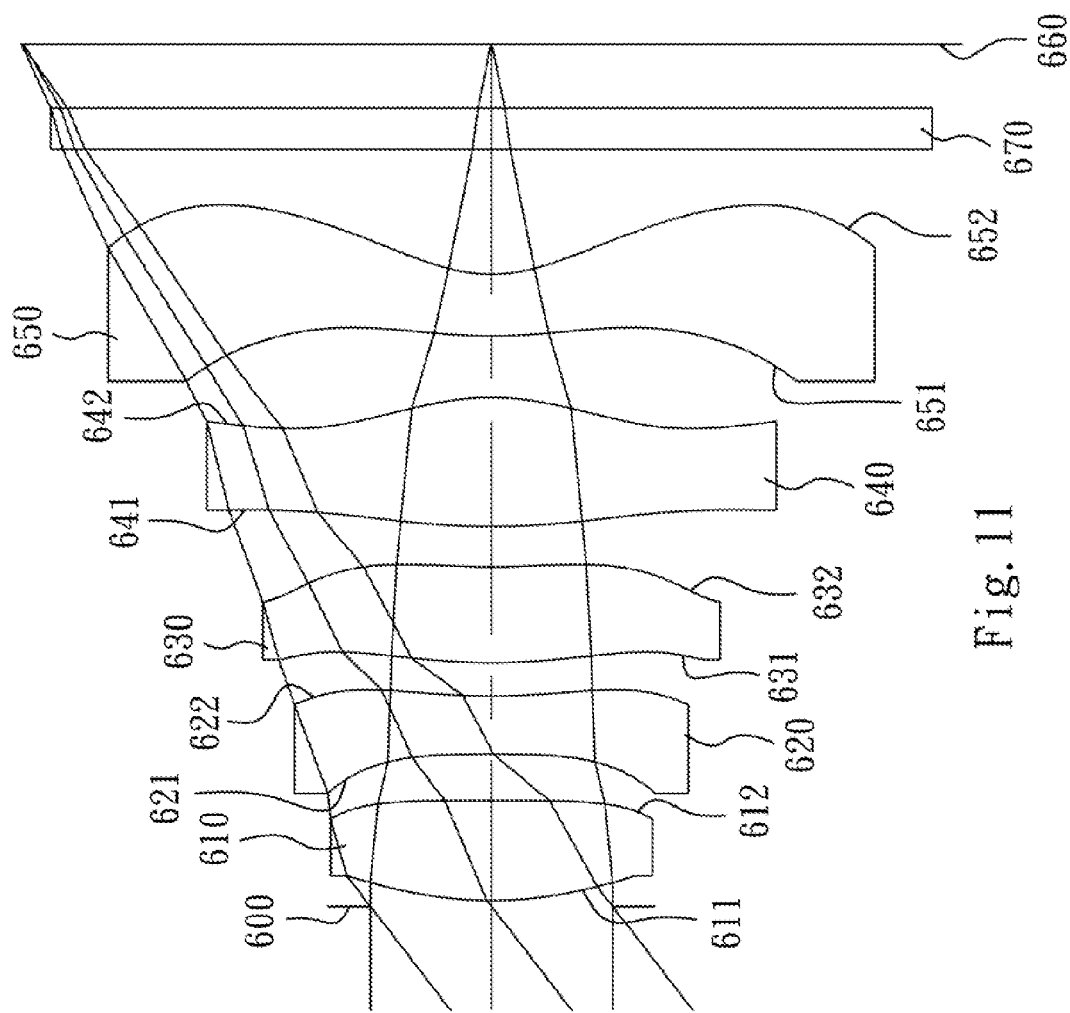
FIG. 11 is a schematic view of an image capturing optical lens assembly according to the sixth embodiment of the present disclosure.
Figure 12:
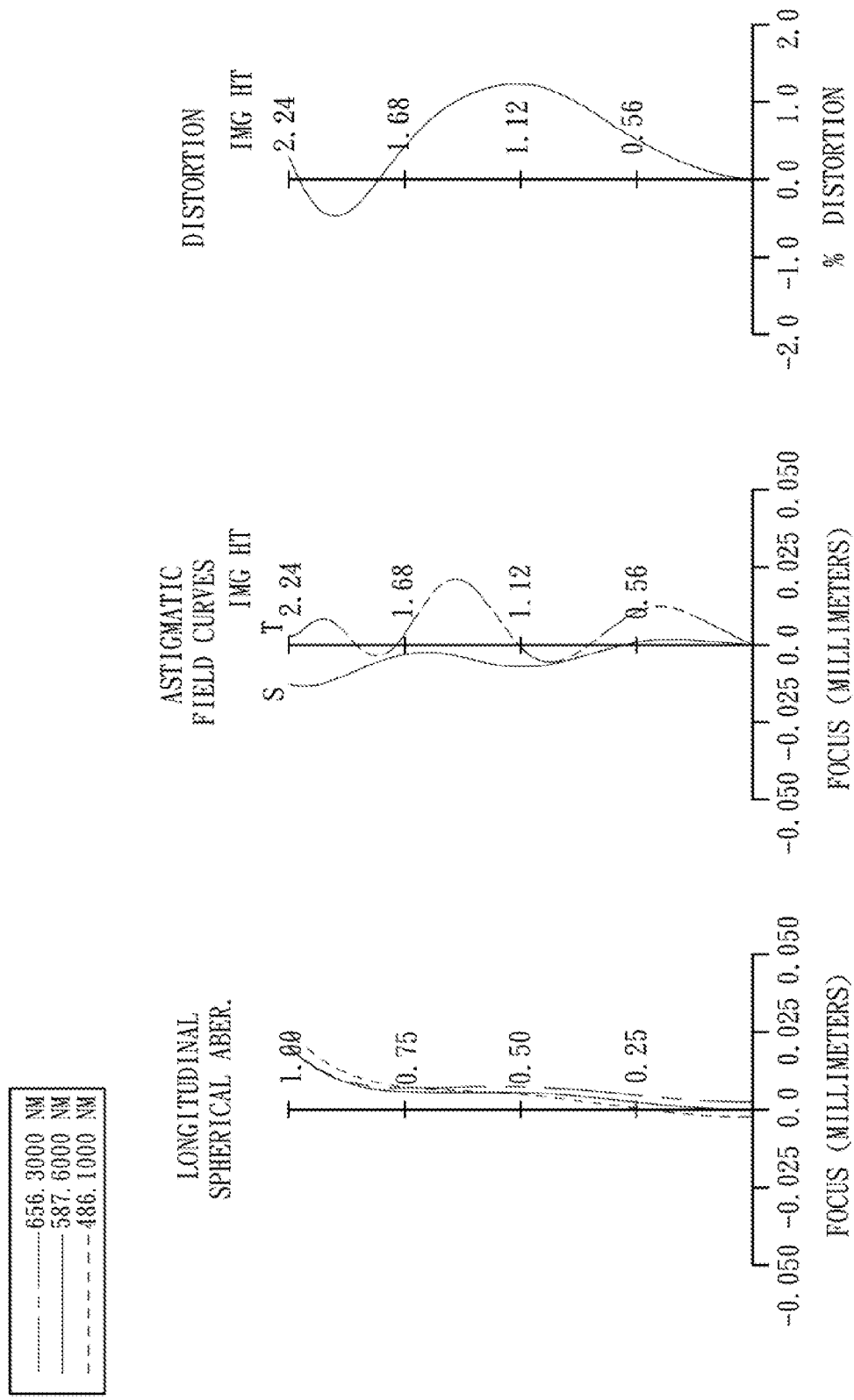
FIG. 12 shows spherical aberration curves, astigmatic field curves and a distortion curve of the image capturing optical lens assembly according to the sixth embodiment.

FIG. 11 is a schematic view of an image capturing optical lens assembly according to the sixth embodiment of the present disclosure. FIG. 12 shows spherical aberration curves, astigmatic field curves and a distortion curve of the image capturing optical lens assembly according to the sixth embodiment. In FIG. 11, the image capturing optical lens assembly includes, in order from an object side to an image side, an aperture stop 600, the first lens element 610, the second lens element 620, the third lens element 630, the fourth lens element 640, the fifth lens element 650, an IR cut filter 670 and an image plane 660.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a concave image-side surface 622, and is made of plastic material. The object-side surface 621 and the image-side surface 622 of the second lens element 620 are aspheric.

The third lens element 630 with positive refractive power has a convex object-side surface 631 and a concave image-side surface 632, and is made of plastic material. The object-side surface 631 and the image-side surface 632 of the third lens element 630 are aspheric.

The fourth lens element 640 with positive refractive power has a convex object-side surface 641 and a convex image-side surface 642, and is made of plastic material. The object-side surface 641 and the image-side surface 642 of the fourth lens element 640 are aspheric.

The fifth lens element 650 with negative refractive power has a convex object-side surface 651 and a concave image-side surface 652, and is made of plastic material. The object-side surface 651 and the image-side surface 652 of the fifth lens element 650 are aspheric. Furthermore, the fifth lens element 650 has inflection points formed on the object-side surface 651 and the image-side surface 652 thereof.

The IR cut filter 670 is located between the fifth lens element 650 and the image plane 660, and will not affect the focal length of the image capturing optical lens assembly.

The equation of the aspheric surface profiles of the above lens elements of the sixth embodiment is the same as that of the first embodiment, and will not be stated herein again.

The detailed optical data of the sixth embodiment are shown in Table 11 and the aspheric surface data are shown in Table 12 below.

TABLE 11

6th Embodiment
f = 2.90 mm, Fno = 2.50, HFOV = 37.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.029 | | | | |
| 2 | Lens 1 | 1.918070 | (ASP) | 0.477 | Plastic | 1.544 | 55.9 | 3.37 |
| 3 | | −37.587900 | (ASP) | 0.225 | | | | |
| 4 | Lens 2 | −7.767100 | (ASP) | 0.275 | Plastic | 1.634 | 23.8 | −3.26 |
| 5 | | 2.859860 | (ASP) | 0.162 | | | | |
| 6 | Lens 3 | 2.755860 | (ASP) | 0.458 | Plastic | 1.544 | 55.9 | 11.94 |
| 7 | | 4.504700 | (ASP) | 0.196 | | | | |
| 8 | Lens 4 | 3.451100 | (ASP) | 0.618 | Plastic | 1.544 | 55.9 | 1.71 |
| 9 | | −1.192620 | (ASP) | 0.293 | | | | |
| 10 | Lens 5 | 2.587940 | (ASP) | 0.295 | Plastic | 1.544 | 55.9 | −1.93 |
| 11 | | 0.717980 | (ASP) | 0.600 | | | | |
| 12 | IR-Filter | Plano | | 0.200 | Glass | 1.517 | 64.2 | — |
| 13 | | Plano | | 0.303 | | | | |
| 14 | Image | Plano | | — | | | | |

Note:
Reference wavelength (d-line) is 587.6 nm.

TABLE 12

Aspheric Coefficients

| Surface # | 2 | 3 | 4 | 5 | 6 |
|---|---|---|---|---|---|
| k = | −1.17664E+01 | −1.00000E+00 | −1.00000E+00 | −2.81370E+01 | 2.57234E+00 |
| A4 = | 1.91786E−01 | −1.07707E−01 | −3.48309E−01 | −1.41852E−01 | −1.76287E−01 |
| A6 = | −2.80271E−01 | −1.73126E−01 | −3.70807E−02 | −9.71645E−02 | −5.19280E−02 |
| A8 = | 3.11197E−01 | 1.35502E−01 | 3.99993E−02 | 2.38851E−01 | 2.26809E−01 |
| A10 = | −3.41593E−01 | −3.29301E−01 | −6.35870E−01 | −4.75256E−01 | −4.15536E−01 |

TABLE 12-continued

Aspheric Coefficients

| | | | | | |
|---|---|---|---|---|---|
| A12 = | −9.42319E−02 | −5.79924E−03 | 8.66233E−01 | 3.62136E−01 | 2.46410E−01 |
| A14 = | −1.65949E−02 | −6.65850E−02 | −2.28404E−01 | −6.86556E−02 | −2.17404E−02 |

| Surface # | 7 | 8 | 9 | 10 | 11 |
|---|---|---|---|---|---|
| k = | −2.00000E+01 | 1.08959E−01 | −6.89774E+00 | −1.00000E+00 | −3.46622E+00 |
| A4 = | −2.75707E−01 | −5.37759E−02 | 6.67288E−02 | −2.61708E−01 | −1.63329E−01 |
| A6 = | −6.05009E−02 | 2.12714E−02 | 1.28171E−01 | 5.21080E−02 | 7.32960E−02 |
| A8 = | 1.37693E−01 | −2.15404E−01 | −1.36065E−01 | 3.59E−02 | −2.13706E−02 |
| A10 = | −6.95284E−02 | 3.11459E−01 | 6.20436E−02 | −1.57515E−02 | 2.99309E−03 |
| A12 = | 3.81672E−02 | −1.67809E−01 | −1.73632E−02 | −3.74E−03 | −3.01879E−04 |
| A14 = | −6.26562E−04 | 3.15711E−02 | 2.48150E−03 | 1.79581E−03 | 3.22867E−05 |

In the image capturing optical lens assembly according to the sixth embodiment, the definitions of f, Fno, HFOV, V1, V2, R3, R4, R7, R8, f1, f2 and f4 are the same as those stated in the first embodiment with corresponding values for the sixth embodiment. Moreover, these parameters can be calculated from Table 11 and Table 12 as the following values and satisfy the following relationships:

| | |
|---|---|
| f (mm) | 2.90 |
| Fno | 2.50 |
| HFOV (deg.) | 37.6 |
| V1 − V2 | 32.1 |
| (R3 + R4)/(R3 − R4) | 0.46 |
| R7/R8 | −2.89 |
| f/f1 | 0.86 |
| f/f2 | −0.89 |
| f/f4 | 1.70 |
| f1/f2 | −1.03 |

Figure 13:
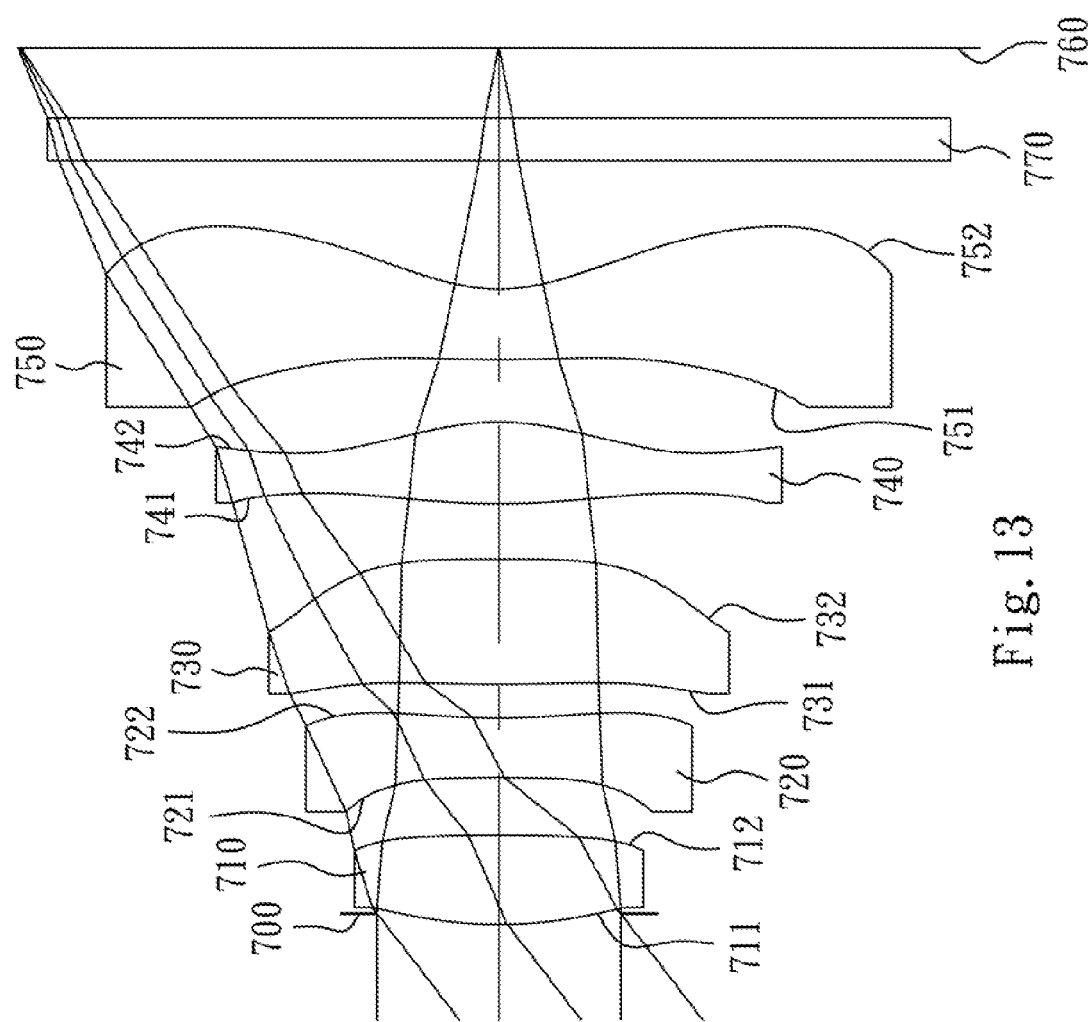
FIG. 13 is a schematic view of an image capturing optical lens assembly according to the seventh embodiment of the present disclosure.
Figure 14:
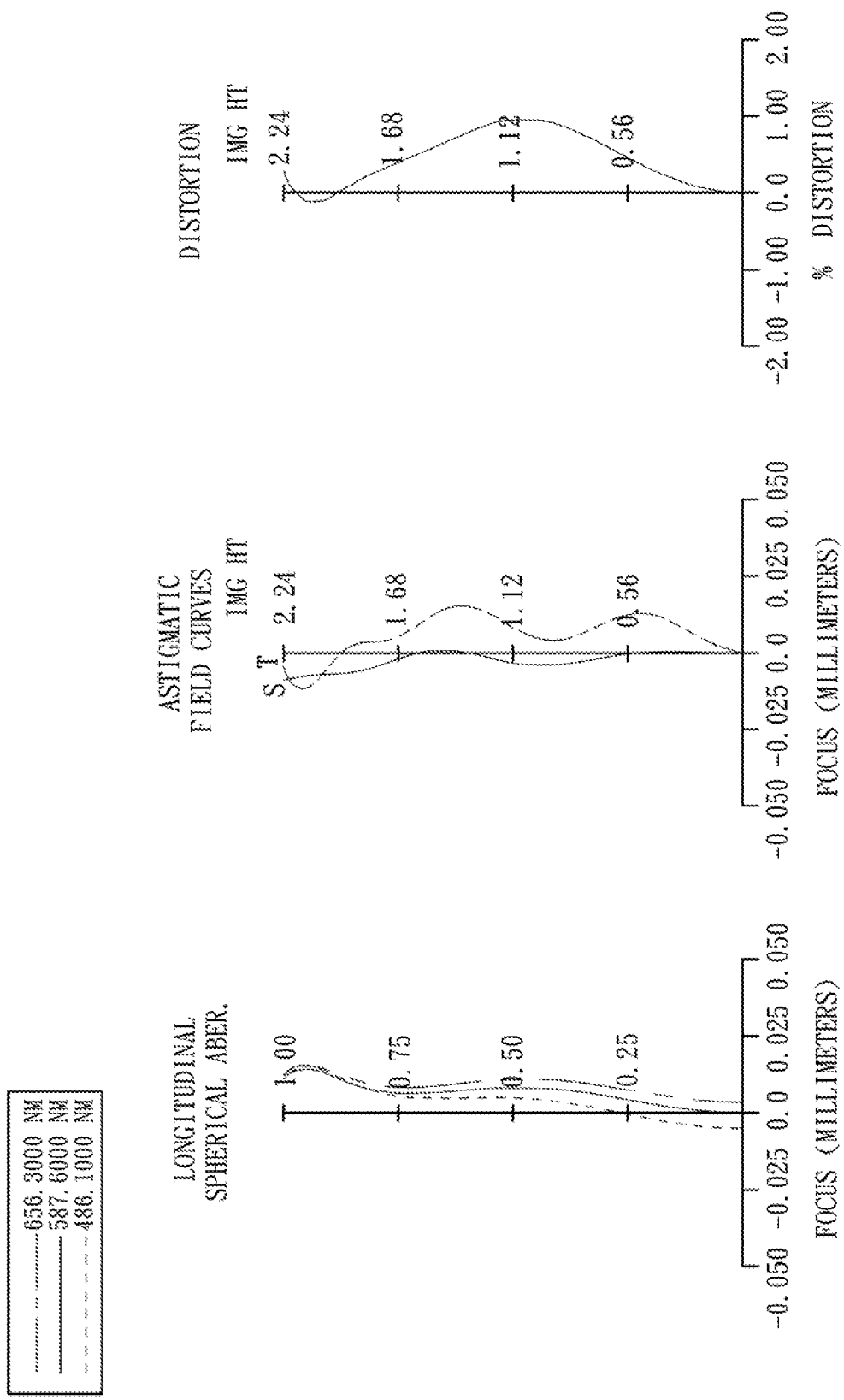
FIG. 14 shows spherical aberration curves, astigmatic field curves and a distortion curve of the image capturing optical lens assembly according to the seventh embodiment.

FIG. 13 is a schematic view of an image capturing optical lens assembly according to the seventh embodiment of the present disclosure. FIG. 14 shows spherical aberration curves, astigmatic field curves and a distortion curve of the image capturing optical lens assembly according to the seventh embodiment. In FIG. 13, the image capturing optical lens assembly includes, in order from an object side to an image side, an aperture stop 700, the first lens element 710, the second lens element 720, the third lens element 730, the fourth lens element 740, the fifth lens element 750, an IR cut filter 770 and an image plane 760.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a concave image-side surface 722, and is made of plastic material. The object-side surface 721 and the image-side surface 722 of the second lens element 720 are aspheric.

The third lens element 730 with positive refractive power has a convex object-side surface 731 and a convex image-side surface 732, and is made of plastic material. The object-side surface 731 and the image-side surface 732 of the third lens element 730 are aspheric.

The fourth lens element 740 with positive refractive power has a convex object-side surface 741 and a convex image-side surface 742, and is made of plastic material. The object-side surface 741 and the image-side surface 742 of the fourth lens element 740 are aspheric.

The fifth lens element 750 with negative refractive power has a convex object-side surface 751 and a concave image-side surface 752, and is made of plastic material. The object-side surface 751 and the image-side surface 752 of the fifth lens element 750 are aspheric. Furthermore, the fifth lens element 750 has inflection points formed on the object-side surface 751 and the image-side surface 752 thereof.

The IR cut filter 770 is located between the fifth lens element 750 and the image plane 760, and will not affect the focal length of the image capturing optical lens assembly.

The equation of the aspheric surface profiles of the above lens elements of the seventh embodiment is the same as that of the first embodiment, and will not be stated herein again.

The detailed optical data of the seventh embodiment are shown in Table 13 and the aspheric surface data are shown in Table 14 below.

TABLE 13

7th Embodiment
f = 2.90 mm, Fno = 2.55, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.050 | | | | |
| 2 | Lens 1 | 2.013750 (ASP) | 0.413 | Plastic | 1.544 | 55.9 | 3.32 |
| 3 | | −16.239600 (ASP) | 0.275 | | | | |
| 4 | Lens 2 | −8.101100 (ASP) | 0.275 | Plastic | 1.640 | 23.3 | −3.63 |
| 5 | | 3.299300 (ASP) | 0.161 | | | | |
| 6 | Lens 3 | 8.600700 (ASP) | 0.585 | Plastic | 1.544 | 55.9 | 12.71 |
| 7 | | −34.401900 (ASP) | 0.257 | | | | |
| 8 | Lens 4 | 3.473300 (ASP) | 0.384 | Plastic | 1.544 | 55.9 | 1.69 |
| 9 | | −1.200370 (ASP) | 0.290 | | | | |
| 10 | Lens 5 | 6.636100 (ASP) | 0.330 | Plastic | 1.544 | 55.9 | −1.77 |
| 11 | | 0.825480 (ASP) | 0.600 | | | | |
| 12 | IR-Filter | Plano | 0.200 | Glass | 1.517 | 64.2 | — |

TABLE 13-continued

7th Embodiment
f = 2.90 mm, Fno = 2.55, HFOV = 37.5 deg.

| Surface # | | Curvature Radius | Thickness | Material | Index | Abbe # | Focal length |
|---|---|---|---|---|---|---|---|
| 13 | | Plano | 0.329 | | | | |
| 14 | Image | Plano | — | | | | |

Note:
Reference wavelength (d-line) is 587.6 nm.

TABLE 14

Aspheric Coefficients

| Surface # | 2 | 3 | 4 | 5 | 6 |
|---|---|---|---|---|---|
| k = | −1.32734E+01 | −1.00000E+00 | −1.00000E+00 | −3.23194E+01 | 3.00000E+00 |
| A4 = | 1.69567E−01 | −1.24375E−01 | −3.60877E−01 | −1.36084E−01 | −1.32001E−01 |
| A6 = | −3.11427E−01 | −2.45376E−01 | −7.44782E−02 | −1.06581E−01 | −7.46307E−02 |
| A8 = | 2.93870E−01 | 1.58758E−01 | −2.39893E−01 | 2.33975E−01 | 2.50051E−01 |
| A10 = | −6.88660E−01 | −7.38048E−01 | −6.55077E−01 | −4.65720E−01 | −3.66382E−01 |
| A12 = | −9.42319E−02 | −5.79924E−03 | 8.66233E−01 | 3.59673E−01 | 2.67513E−01 |
| A14 = | −1.65949E−02 | −6.65850E−02 | −2.28404E−01 | −6.89099E−02 | −5.17077E−02 |

| Surface # | 7 | 8 | 9 | 10 | 11 |
|---|---|---|---|---|---|
| k = | 3.00000E+00 | −2.01134E+01 | −6.06302E+00 | −1.00000E+00 | −4.13645E+00 |
| A4 = | −3.65776E−01 | −5.58356E−02 | 9.05334E−02 | −1.96703E−01 | −1.43775E−01 |
| A6 = | −3.56730E−02 | 3.39925E−02 | 1.17492E−01 | 6.00724E−02 | 6.44290E−02 |
| A8 = | 1.50946E−01 | −2.18167E−01 | −1.36996E−01 | 3.08348E−02 | −1.93125E−02 |
| A10 = | −6.86193E−02 | 3.09895E−01 | 6.21067E−02 | −1.70339E−02 | 3.44600E−03 |
| A12 = | 3.67328E−02 | −1.68266E−01 | −1.72069E−02 | −4.06578E−03 | −5.44316E−04 |
| A14 = | 6.29146E−04 | 3.14614E−02 | 2.64393E−03 | 2.05999E−03 | 4.48724E−05 |

In the image capturing optical lens assembly according to the seventh embodiment, the definitions of f, Fno, HFOV, V1, V2, R3, R4, R7, R8, f1, f2 and f4 are the same as those stated in the first embodiment with corresponding values for the seventh embodiment. Moreover, these parameters can be calculated from Table 13 and Table 14 as the following values and satisfy the following relationships:

| | |
|---|---|
| f (mm) | 2.90 |
| Fno | 2.55 |
| HFOV (deg.) | 37.5 |
| V1 − V2 | 32.6 |
| (R3 + R4)/(R3 − R4) | 0.42 |
| R7/R8 | −2.89 |
| f/f1 | 0.87 |
| f/f2 | −0.80 |
| f/f4 | 1.72 |
| f1/f2 | −0.91 |

Figure 15:
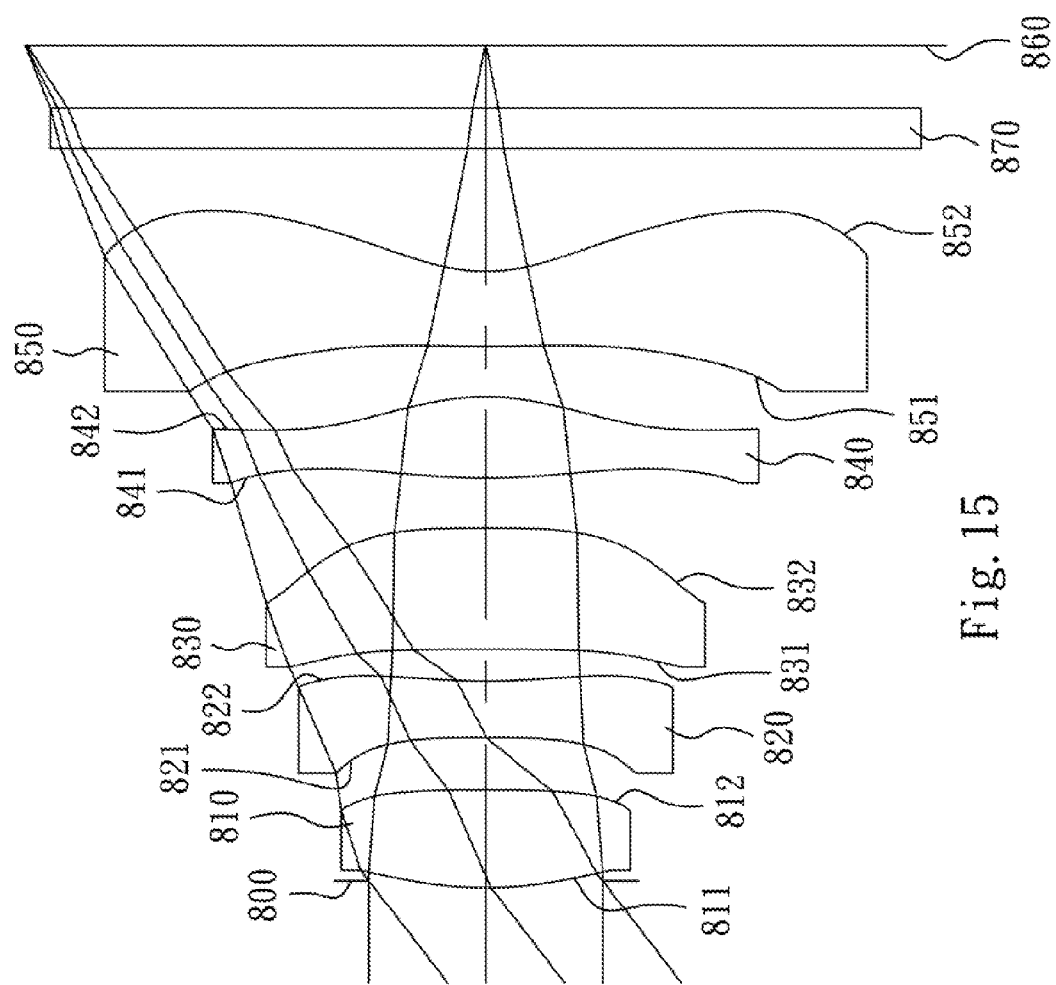
FIG. 15 is a schematic view of an image capturing optical lens assembly according to the eighth embodiment of the present disclosure.
Figure 16:
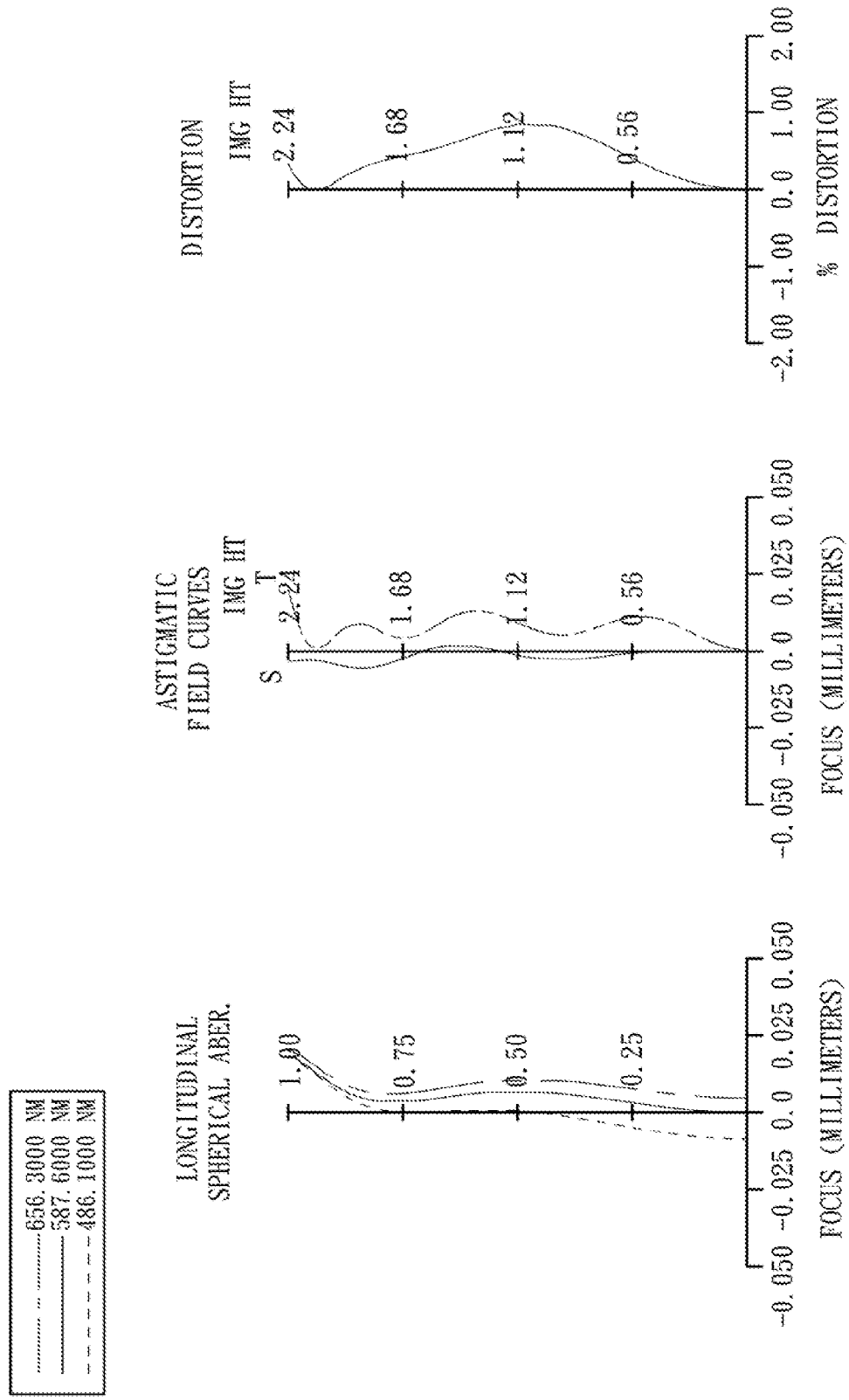
FIG. 16 shows spherical aberration curves, astigmatic field curves and a distortion curve of the image capturing optical lens assembly according to the eighth embodiment.

FIG. 15 is a schematic view of an image capturing optical lens assembly according to the eighth embodiment of the present disclosure. FIG. 16 shows spherical aberration curves, astigmatic field curves and a distortion curve of the image capturing optical lens assembly according to the eighth embodiment. In FIG. 15, the image capturing optical lens assembly includes, in order from an object side to an image side, an aperture stop 800, the first lens element 810, the second lens element 820, the third lens element 830, the fourth lens element 840, the fifth lens element 850, an IR cut filter 870 and an image plane 860.

The first lens element 810 with positive refractive power has a convex object-side surface 811 and a convex image-side surface 812, and is made of plastic material. The object-side surface 811 and the image-side surface 812 of the first lens element 810 are aspheric.

The second lens element 820 with negative refractive power has a concave object-side surface 821 and a concave image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with positive refractive power has a convex object-side surface 841 and a convex image-side surface 842, and is made of plastic material. The object-side surface 841 and the image-side surface 842 of the fourth lens element 840 are aspheric.

The fifth lens element 850 with negative refractive power has a convex object-side surface 851 and a concave image-side surface 852, and is made of plastic material. The object-side surface 851 and the image-side surface 852 of the fifth lens element 850 are aspheric. Furthermore, the fifth lens element 850 has inflection points formed on the object-side surface 851 and the image-side surface 852 thereof.

The IR cut filter 870 is located between the fifth lens element 850 and the image plane 860, and will not affect the focal length of the image capturing optical lens assembly.

The equation of the aspheric surface profiles of the above lens elements of the eighth embodiment is the same as that of the first embodiment, and will not be stated herein again.

The detailed optical data of the eighth embodiment are shown in Table 15 and the aspheric surface data are shown in Table 16 below.

TABLE 15

8th Embodiment
f = 2.90 mm, Fno = 2.55, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.033 | | | | |
| 2 | Lens 1 | 1.952290 | (ASP) | 0.473 | Plastic | 1.544 | 55.9 | 3.18 |
| 3 | | −13.805500 | (ASP) | 0.257 | | | | |
| 4 | Lens 2 | −10.913200 | (ASP) | 0.275 | Plastic | 1.640 | 23.3 | −4.08 |
| 5 | | 3.470300 | (ASP) | 0.157 | | | | |
| 6 | Lens 3 | −90.909100 | (ASP) | 0.590 | Plastic | 1.544 | 55.9 | 33.36 |
| 7 | | −15.166700 | (ASP) | 0.242 | | | | |
| 8 | Lens 4 | 3.301400 | (ASP) | 0.399 | Plastic | 1.544 | 55.9 | 1.61 |
| 9 | | −1.140890 | (ASP) | 0.243 | | | | |
| 10 | Lens 5 | 10.718500 | (ASP) | 0.364 | Plastic | 1.544 | 55.9 | −1.66 |
| 11 | | 0.821820 | (ASP) | 0.600 | | | | |
| 12 | IR-Filter | Plano | | 0.200 | Glass | 1.517 | 64.2 | — |
| 13 | | Plano | | 0.302 | | | | |
| 14 | Image | Plano | | — | | | | |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −1.19689E+01 | −1.00000E+00 | −1.00000E+00 | −2.29578E+01 | −2.00000E+01 |
| A4 = | 1.68698E−01 | −1.54213E−01 | −3.72174E−01 | −1.32770E−01 | −1.04936E−01 |
| A6 = | −3.62662E−01 | −2.97060E−01 | −1.54595E−01 | −1.18651E−01 | −9.88618E−02 |
| A8 = | 5.27735E−01 | 2.46864E−01 | −2.69726E−01 | 2.40063E−01 | 2.57453E−01 |
| A10 = | −1.01535E+00 | −7.04759E−01 | −3.72009E−01 | −4.39629E−01 | −3.59476E−01 |
| A12 = | −9.42319E−02 | −5.79924E−03 | 8.66233E−01 | 3.96190E−01 | 2.63216E−01 |
| A14 = | −1.65949E−02 | −6.65850E−02 | −2.28404E−01 | −1.23711E−01 | −4.74738E−02 |

| Surface # | 7 | 8 | 9 | 10 | 11 |
|---|---|---|---|---|---|
| k = | 3.00000E+00 | −1.62772E+01 | −5.78105E+00 | −1.00000E+00 | −4.40079E+00 |
| A4 = | −3.87786E−01 | −8.39686E−02 | 8.96819E−02 | −1.74388E−01 | −1.32496E−01 |
| A6 = | −2.49915E−02 | 4.33424E−02 | 1.10405E−01 | 6.28978E−02 | 5.83880E−02 |
| A8 = | 1.51722E−01 | −2.17465E−01 | −1.37331E−01 | 2.77485E−02 | −1.72388E−02 |
| A10 = | −6.93776E−02 | 3.07454E−01 | 6.25123E−02 | −1.75951E−02 | 3.24052E−03 |
| A12 = | 3.69063E−02 | −1.68398E−01 | −1.70933E−02 | −4.00917E−03 | −5.96251E−04 |
| A14 = | 2.43085E−03 | 3.18081E−02 | 2.72283E−03 | 2.17286E−03 | 5.58231E−05 |

In the image capturing optical lens assembly according to the eighth embodiment, the definitions of f, Fno, HFOV, V1, V2, R3, R4, R7, R8, f1, f2 and f4 are the same as those stated in the first embodiment with corresponding values for the eighth embodiment. Moreover, these parameters can be calculated from Table 15 and Table 16 as the following values and satisfy the following relationships:

| | |
|---|---|
| f (mm) | 2.90 |
| Fno | 2.55 |
| HFOV (deg.) | 37.5 |
| V1 − V2 | 32.6 |
| (R3 + R4)/(R3 − R4) | 0.52 |
| R7/R8 | −2.89 |
| f/f1 | 0.91 |
| f/f2 | −0.71 |
| f/f4 | 1.80 |
| f1/f2 | −0.78 |

Figure 17:
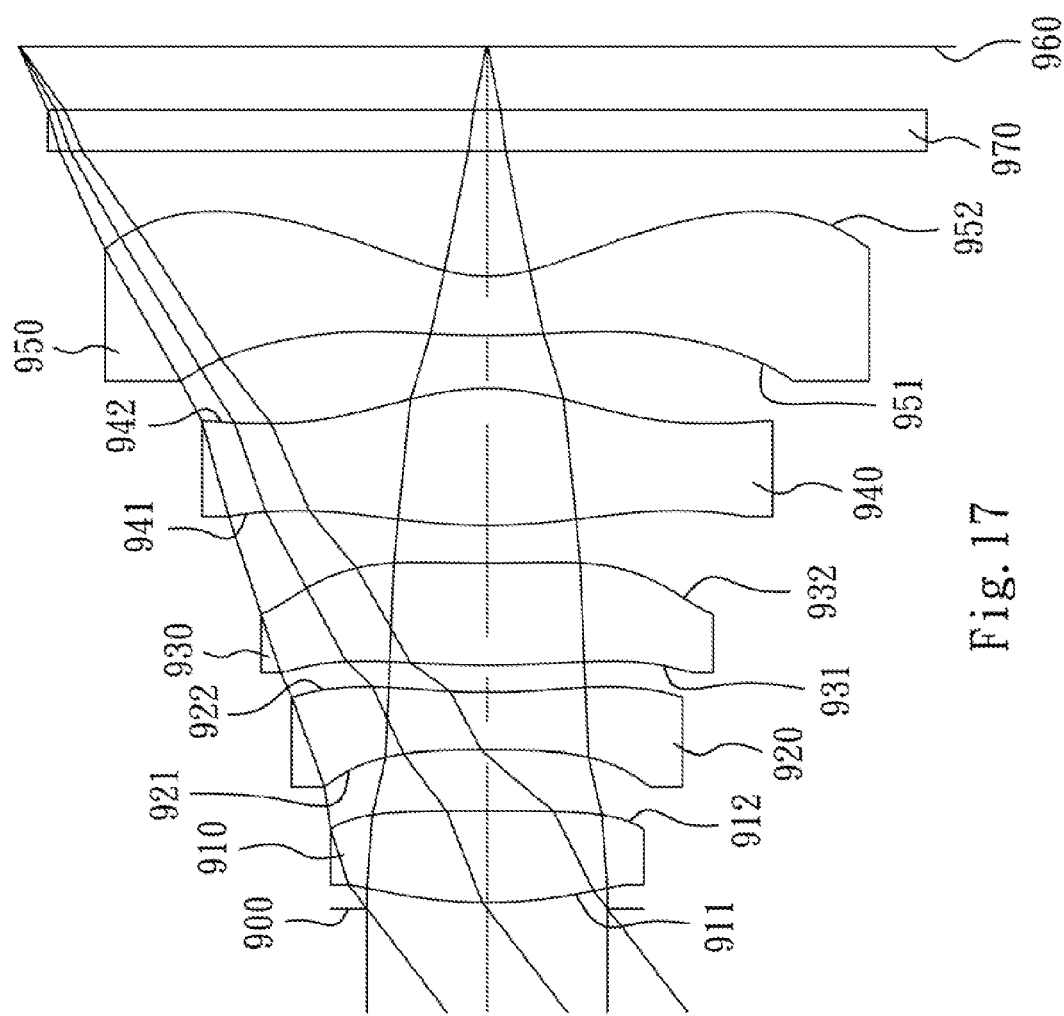
FIG. 17 is a schematic view of an image capturing optical lens assembly according to the ninth embodiment of the present disclosure.
Figure 18:
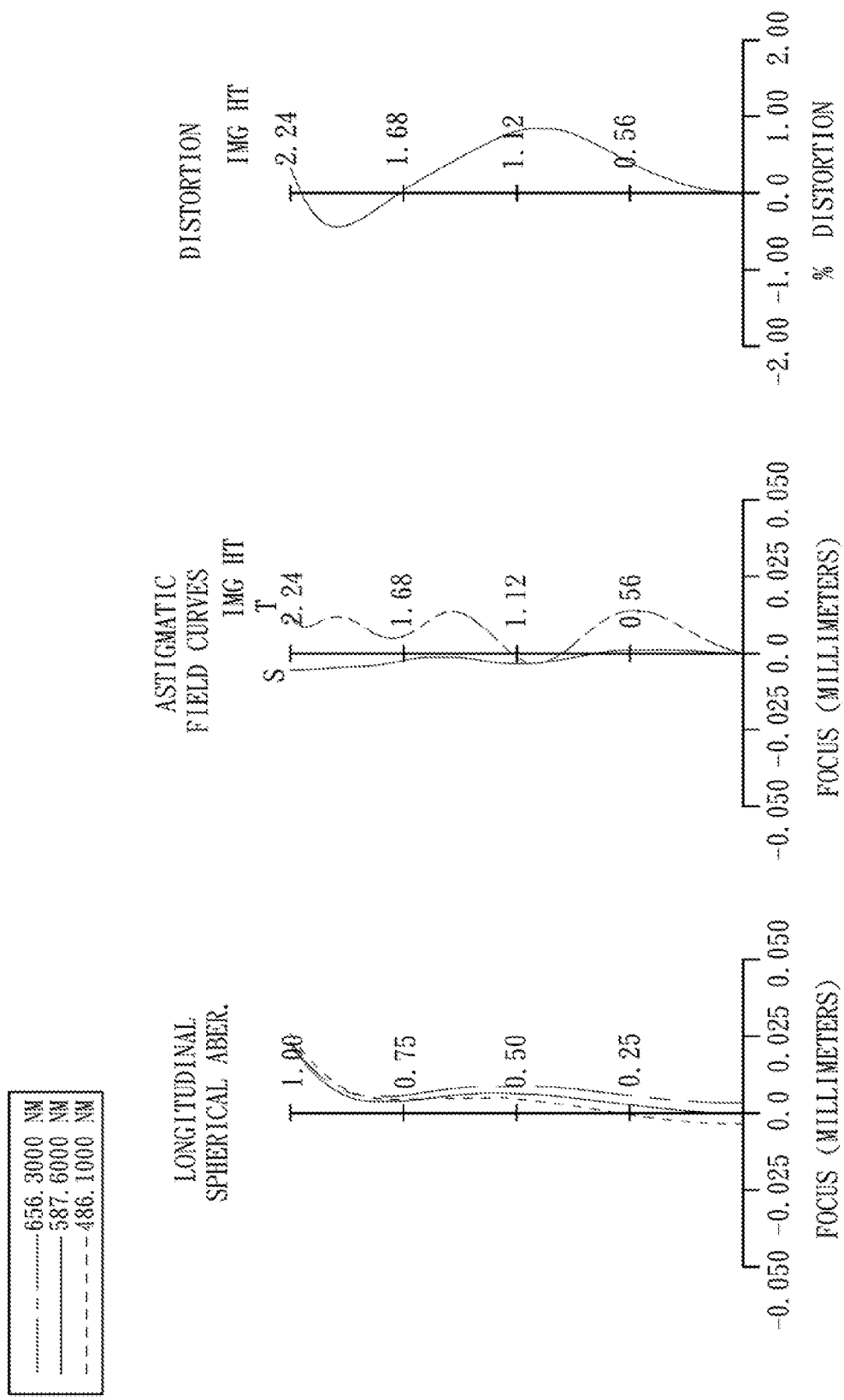
FIG. 18 shows spherical aberration curves, astigmatic field curves and a distortion curve of the image capturing optical lens assembly according to the ninth embodiment.

FIG. 17 is a schematic view of an image capturing optical lens assembly according to the ninth embodiment of the present disclosure. FIG. 18 shows spherical aberration curves, astigmatic field curves and a distortion curve of the image capturing optical lens assembly according to the ninth embodiment. In FIG. 17, the image capturing optical lens assembly includes, in order from an object side to an image side, an aperture stop 900, the first lens element 910, the second lens element 920, the third lens element 930, the fourth lens element 940, the fifth lens element 950, an IR cut filter 970 and an image plane 960.

The first lens element 910 with positive refractive power has a convex object-side surface 911 and a convex image-side surface 912, and is made of plastic material. The object-side surface 911 and the image-side surface 912 of the first lens element 910 are aspheric.

The second lens element 920 with negative refractive power has a concave object-side surface 921 and a concave image-side surface 922, and is made of plastic material. The object-side surface 921 and the image-side surface 922 of the second lens element 920 are aspheric.

The third lens element 930 with positive refractive power has a convex object-side surface 931 and a concave image-side surface 932, and is made of plastic material. The object-side surface 931 and the image-side surface 932 of the third lens element 930 are aspheric.

The fourth lens element 940 with positive refractive power has a convex object-side surface 941 and a convex image-side surface 942, and is made of plastic material. The object-side surface 941 and the image-side surface 942 of the fourth lens element 940 are aspheric.

The fifth lens element 950 with negative refractive power has a convex object-side surface 951 and a concave image-side surface 952, and is made of plastic material. The object-side surface 951 and the image-side surface 952 of the fifth lens element 950 are aspheric. Furthermore, the fifth lens element 950 has inflection points formed on the object-side surface 951 and the image-side surface 952 thereof.

The IR cut filter 970 is located between the fifth lens element 950 and the image plane 960, and will not affect the focal length of the image capturing optical lens assembly.

The equation of the aspheric surface profiles of the above lens elements of the ninth embodiment is the same as that of the first embodiment, and will not be stated herein again.

The detailed optical data of the ninth embodiment are shown in Table 17 and the aspheric surface data are shown in Table 18 below.

In the image capturing optical lens assembly according to the ninth embodiment, the definitions of f, Fno, HFOV, V1, V2, R3, R4, R7, R8, f1, f2 and f4 are the same as those stated in the first embodiment with corresponding values for the ninth embodiment. Moreover, these parameters can be calculated from Table 17 and Table 18 as the following values and satisfy the following relationships:

| | |
|---|---|
| f (mm) | 2.90 |
| Fno | 2.52 |
| HFOV (deg.) | 37.5 |
| V1 − V2 | 36.3 |
| (R3 + R4)/(R3 − R4) | 0.42 |
| R7/R8 | −2.51 |
| f/f1 | 0.87 |
| f/f2 | −0.80 |
| f/f4 | 1.85 |
| f1/f2 | −0.92 |

Figure 19:
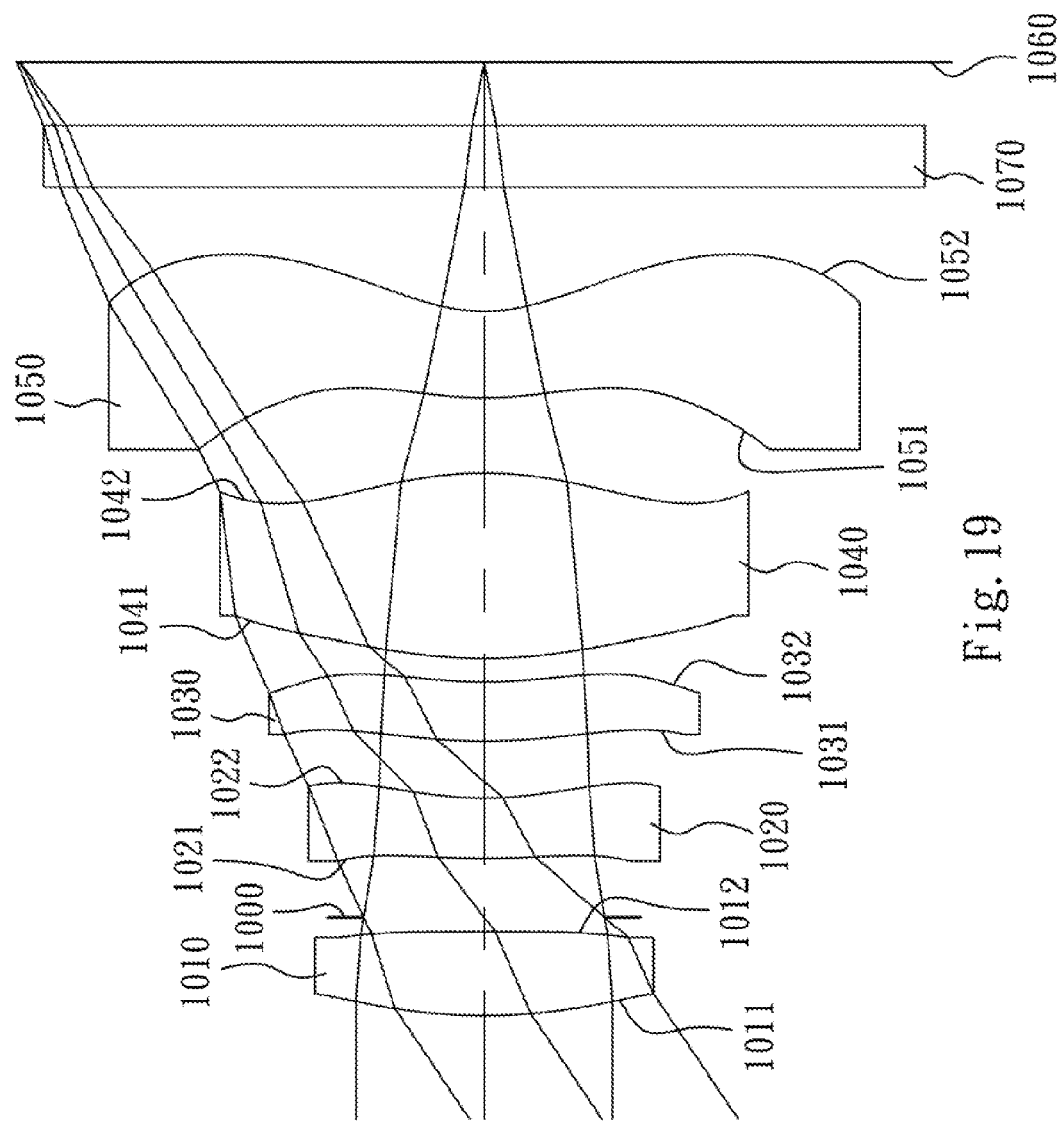
FIG. 19 is a schematic view of an image capturing optical lens assembly according to the tenth embodiment of the present disclosure.
Figure 20:
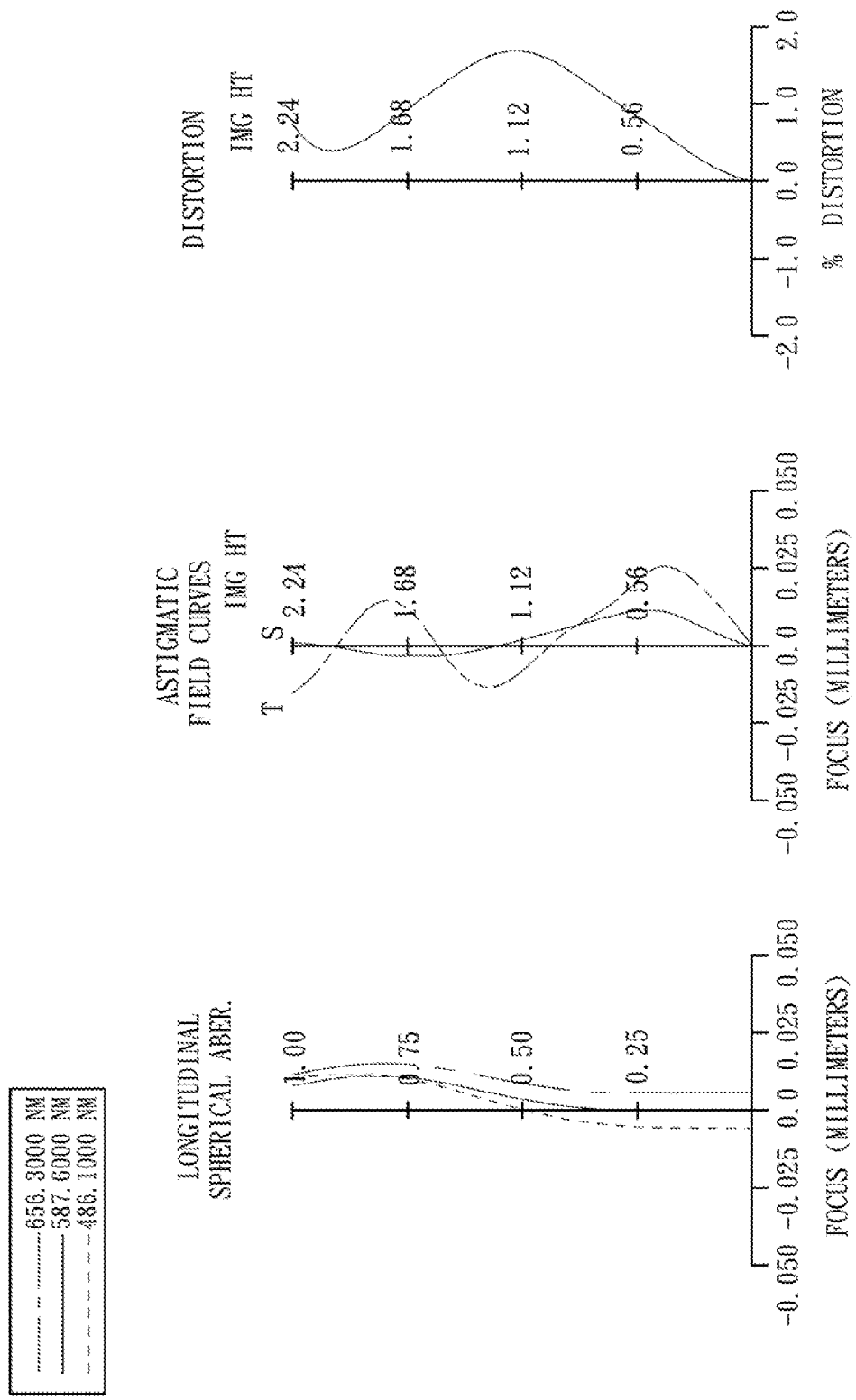
FIG. 20 shows spherical aberration curves, astigmatic field curves and a distortion curve of the image capturing optical lens assembly according to the tenth embodiment.

FIG. 19 is a schematic view of an image capturing optical lens assembly according to the tenth embodiment of the present disclosure. FIG. 20 shows spherical aberration curves, astigmatic field curves and a distortion curve of the

TABLE 17

9th Embodiment
f = 2.90 mm, Fno = 2.52, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.029 | | | | |
| 2 | Lens 1 | 2.172020 (ASP) | 0.436 | Glass | 1.640 | 60.1 | 3.35 |
| 3 | | −158.537800 (ASP) | 0.295 | | | | |
| 4 | Lens 2 | −8.095200 (ASP) | 0.275 | Plastic | 1.634 | 23.8 | −3.65 |
| 5 | | 3.286300 (ASP) | 0.132 | | | | |
| 6 | Lens 3 | 4.471400 (ASP) | 0.486 | Plastic | 1.544 | 55.9 | 24.94 |
| 7 | | 6.412600 (ASP) | 0.185 | | | | |
| 8 | Lens 4 | 2.824990 (ASP) | 0.656 | Plastic | 1.544 | 55.9 | 1.57 |
| 9 | | −1.123840 (ASP) | 0.251 | | | | |
| 10 | Lens 5 | 4.054500 (ASP) | 0.285 | Plastic | 1.544 | 55.9 | −1.73 |
| 11 | | 0.743670 (ASP) | 0.600 | | | | |
| 12 | IR-Filter | Plano | 0.200 | Glass | 1.517 | 64.2 | — |
| 13 | | Plano | 0.301 | | | | |
| 14 | Image | Plano | — | | | | |

Note:
Reference wavelength (d-line) is 587.6 nm.

TABLE 18

Aspheric Coefficients

| Surface # | 2 | 3 | 4 | 5 | 6 |
|---|---|---|---|---|---|
| k = | −1.56149E+01 | −1.00000E+00 | −1.00000E+00 | −3.36827E+01 | 3.00000E+00 |
| A4 = | 1.49593E−01 | −1.32482E−01 | −3.43935E−01 | −1.35259E−01 | −1.55525E−01 |
| A6 = | −3.42639E−01 | −1.85377E−01 | −2.92199E−02 | −8.39685E−02 | −6.99311E−02 |
| A8 = | 4.71242E−01 | 1.54444E−01 | −1.04590E−01 | 2.49260E−01 | 2.29237E−01 |
| A10 = | −7.29027E−01 | −4.30917E−01 | −4.93991E−01 | −4.64200E−01 | −3.88807E−01 |
| A12 = | −9.42319E−02 | −5.79922E−03 | 8.66233E−01 | 3.75974E−01 | 2.64543E−01 |
| A14 = | | | −2.28404E−01 | −8.37309E−02 | −3.43715E−02 |

| Surface # | 7 | 8 | 9 | 10 | 11 |
|---|---|---|---|---|---|
| k = | −2.00000E+01 | −1.05416E+01 | −6.61840E+00 | −1.00000E+00 | −4.04352E+00 |
| A4 = | −3.38715E−01 | −6.04701E−02 | 7.00041E−02 | −2.29191E−01 | −1.51281E−01 |
| A6 = | −5.05928E−02 | 3.16166E−02 | 1.16210E−01 | 6.33052E−02 | 6.82547E−02 |
| A8 = | 1.49005E−01 | −2.20385E−01 | −1.35340E−01 | 3.24809E−02 | −1.93677E−02 |
| A10 = | −6.82267E−02 | 3.09543E−01 | 6.31883E−02 | −1.71171E−02 | 2.98847E−03 |
| A12 = | 3.63971E−02 | −1.67664E−01 | −1.70825E−02 | −3.78423E−03 | −4.63167E−04 |
| A14 = | −1.28828E−03 | 3.21657E−02 | 2.40018E−03 | 1.94310E−03 | 5.48916E−05 | image capturing optical lens assembly according to the tenth embodiment. In FIG. 19, the image capturing optical lens assembly includes, in order from an object side to an image side, the first lens element 1010, an aperture stop 1000, the second lens element 1020, the third lens element 1030, the fourth lens element 1040, the fifth lens element 1050, an IR cut filter 1070 and an image plane 1060.

The first lens element 1010 with positive refractive power has a convex object-side surface 1011 and a convex image-side surface 1012, and is made of plastic material. The object-side surface 1011 and the image-side surface 1012 of the first lens element 1010 are aspheric.

The second lens element 1020 with negative refractive power has a convex object-side surface 1021 and a concave image-side surface 1022, and is made of plastic material. The object-side surface 1021 and the image-side surface 1022 of the second lens element 1020 are aspheric.

The third lens element 1030 with negative refractive power has a convex object-side surface 1031 and a concave image-side surface 1032, and is made of plastic material. The object-side surface 1031 and the image-side surface 1032 of the third lens element 1030 are aspheric.

The fourth lens element 1040 with positive refractive power has a convex object-side surface 1041 and a convex image-side surface 1042, and is made of plastic material. The object-side surface 1041 and the image-side surface 1042 of the fourth lens element 1040 are aspheric.

The fifth lens element 1050 with negative refractive power has a convex object-side surface 1051 and a concave image-side surface 1052, and is made of plastic material. The object-side surface 1051 and the image-side surface 1052 of the fifth lens element 1050 are aspheric. Furthermore, the fifth lens element 1050 has inflection points formed on the object-side surface 1051 and the image-side surface 1052 thereof.

The IR cut filter 1070 is located between the fifth lens element 1050 and the image plane 1060, and will not affect the focal length of the image capturing optical lens assembly.

The equation of the aspheric surface profiles of the above lens elements of the tenth embodiment is the same as that of the first embodiment, and will not be stated herein again.

The detailed optical data of the tenth embodiment are shown in Table 19 and the aspheric surface data are shown in Table 20 below.

TABLE 19

10th Embodiment
f = 3.27 mm, Fno = 2.65, HFOV = 34.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.661740 (ASP) | 0.406 | Plastic | 1.544 | 55.9 | 4.52 |
| 2 | | −30.921500 (ASP) | 0.070 | | | | |
| 3 | Ape. Stop | Plano | 0.283 | | | | |
| 4 | Lens 2 | 3.891100 (ASP) | 0.294 | Plastic | 1.650 | 21.4 | −5.07 |
| 5 | | 1.731130 (ASP) | 0.272 | | | | |
| 6 | Lens 3 | 2.676360 (ASP) | 0.288 | Plastic | 1.544 | 55.9 | −37.48 |
| 7 | | 2.276140 (ASP) | 0.114 | | | | |
| 8 | Lens 4 | 2.469250 (ASP) | 0.891 | Plastic | 1.530 | 55.8 | 2.14 |
| 9 | | −1.835870 (ASP) | 0.365 | | | | |
| 10 | Lens 5 | 1.708080 (ASP) | 0.416 | Plastic | 1.544 | 55.9 | −3.20 |
| 11 | | 0.788460 (ASP) | 0.600 | | | | |
| 12 | IR-Filter | Plano | 0.300 | Glass | 1.517 | 64.2 | — |
| 13 | | Plano | 0.304 | | | | |
| 14 | Image | Plano | — | | | | |

Note:
Reference wavelength (d-line) is 587.6 nm.

TABLE 20

Aspheric Coefficients

| Surface # | 1 | 2 | 4 | 5 | 6 |
|---|---|---|---|---|---|
| k = | −2.00000E+01 | −1.00000E+00 | −8.41642E+00 | −1.00165E+01 | 2.24021E+00 |
| A4 = | 1.12742E−01 | −7.58001E−02 | −3.00531E−01 | −1.10237E−01 | −2.04733E−01 |
| A6 = | −1.79530E−01 | 7.06315E−03 | 1.78154E−02 | −1.21413E−01 | 8.20420E−03 |
| A8 = | 1.88315E−01 | −7.17476E−02 | 1.82275E−01 | 2.15304E−01 | 2.39639E−01 |
| A10 = | −1.85499E−01 | 4.40269E−02 | −7.52618E−01 | −4.49481E−01 | −4.66546E−01 |
| A12 = | 3.45300E−02 | −8.40747E−02 | 8.26279E−01 | 3.17005E−01 | 2.12429E−01 |
| A14 = | −2.45455E−02 | 1.78184E−03 | −3.89752E−01 | −6.83779E−02 | 2.16926E−02 |

| Surface # | 7 | 8 | 9 | 10 | 11 |
|---|---|---|---|---|---|
| k = | −1.47667E+01 | −6.04697E−01 | −4.26437E+00 | −1.87634E+01 | −3.98552E+00 |
| A4 = | −1.89861E−01 | −6.66878E−02 | 4.83960E−04 | −2.41890E−01 | −1.66482E−01 |
| A6 = | −9.79423E−02 | 3.64267E−02 | 1.56156E−01 | 2.42464E−02 | 7.04382E−02 |
| A8 = | 1.12647E−01 | −2.05972E−01 | −1.25587E−01 | 4.79167E−02 | −1.90784E−02 |
| A10 = | −6.73729E−02 | 3.11425E−01 | 6.56187E−02 | −1.34192E−02 | 2.11169E−03 |
| A12 = | 4.53944E−02 | −1.69347E−01 | −1.77980E−02 | −4.97935E−03 | 5.79001E−05 |
| A14 = | 1.51303E−03 | 3.13273E−02 | 1.32205E−03 | 1.69710E−03 | −3.34137E−05 |

In the image capturing optical lens assembly according to the tenth embodiment, the definitions of f, Fno, HFOV, V1, V2, R3, R4, R7, R8, f1, f2 and f4 are the same as those stated in the first embodiment with corresponding values for the tenth embodiment. Moreover, these parameters can be calculated from Table 19 and Table 20 as the following values and satisfy the following relationships:

| | |
|---|---|
| f (mm) | 3.27 |
| Fno | 2.65 |
| HFOV (deg.) | 34.1 |
| V1 − V2 | 34.5 |
| (R3 + R4)/(R3 − R4) | 2.60 |
| R7/R8 | −1.35 |
| f/f1 | 0.72 |
| f/f2 | −0.65 |
| f/f4 | 1.53 |
| f1/f2 | −0.89 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing optical lens assembly comprising, in order from an object side to an image side:
    a first lens element with positive refractive power;
    a second lens element with negative refractive power;
    a third lens element with refractive power having a convex object-side surface, wherein the object-side surface and an image-side surface of the third lens element are aspheric;
    a fourth lens element with positive refractive power having a convex to object-side surface and a convex image-side surface; and
    a fifth lens element with negative refractive power which is made of plastic material, wherein an object-side surface and an image-side surface of the fifth lens element are aspheric, and the fifth lens element has at least one inflection point formed on at least one of the object-side surface and the image-side surface thereof;
    wherein the image capturing optical lens assembly has a total of five lens elements with refractive power, a curvature radius of an object-side surface of the second lens element is R3, a curvature radius of an image-side surface of the second lens element is R4, a curvature radius of the object-side surface of the fourth lens element is R7, and a curvature radius of the image-side surface of the fourth lens element is R8, the following relationships are satisfied:

$0<(R3+R4)/(R3-R4)<3.0$; and $-3.3<R7/R8<0$.

2. The image capturing optical lens assembly of claim 1, wherein the third lens element and the fourth lens element are made of plastic material, and the fifth lens element has a concave image-side surface.

3. The image capturing optical lens assembly of claim 2, wherein a focal length of the image capturing optical lens assembly is f, and a focal length of the fourth lens element is f4, the following relationship is satisfied:

$1.1<f/f4<3.0$.

4. The image capturing optical lens assembly of claim 2, wherein the curvature radius of the object-side surface of the fourth lens element is R7, and the curvature radius of the image-side surface of the fourth lens element is R8, the following relationship is satisfied:

$-3.3<R7/R8<-0.8$.

5. The image capturing optical lens assembly of claim 4, wherein the curvature radius of the object-side surface of the fourth lens element is R7, and the curvature radius of the image-side surface of the fourth lens element is R8, the following relationship is satisfied:

$-3.3<R7/R8<-1.1$.

6. The image capturing optical lens assembly of claim 2, wherein the Abbe number of the first lens element is V1, and the Abbe number of the second lens element is V2, the following relationship is satisfied:

$30<V1-V2<42$.

7. The image capturing optical lens assembly of claim 2, wherein a focal length of the first lens element is f1, and the focal length of the second lens element is f2, the following relationship is satisfied:

$-1.3<f1/f2<-0.48$.

8. The image capturing optical lens assembly of claim 2, wherein the third lens element has a concave image-side surface.

9. An image capturing optical lens assembly comprising, in order from an object side to an image side:
    a first lens element with positive refractive power;
    a second lens element with negative refractive power;
    a third lens element with refractive power, wherein an object-side surface and an image-side surface of the third lens element are aspheric;
    a fourth lens element with positive refractive power having a convex object-side surface and a convex image-side surface, wherein the object-side surface and the image-side surface of the fourth lens element are aspheric; and
    a fifth lens element with negative refractive power which is made of plastic material, wherein an object-side surface and an image-side surface of the fifth lens element are aspheric, and the fifth lens element has at least one inflection point formed on at least one of the object-side surface and the image-side surface thereof;
    wherein the image capturing optical lens assembly has a total of five lens elements with refractive power, a curvature radius of an object-side surface of the second lens element is R3, a curvature radius of an image-side surface of the second lens element is R4, a curvature radius of the object-side surface of the fourth lends element is R7, a curvature radius of the image-side surface of the fourth lens element is R8, a focal length of the image capturing optical lens assembly is f, the focal length of the second lens element is f2, and a focal length of the fourth lens element is f4, the following relationships are satisfied:

$0<(R3+R4)/(R3-R4)\leq2.61$;

$-5.8<R7/R8<0$;

$1.1<f/f4<3.0$; and $-1.4<f/f2<-0.61$.

10. The image capturing optical lens assembly of claim 9, wherein the third lens element and the fourth lens element are made of plastic material, and the fifth lens element has a concave image-side surface.

11. The image capturing optical lens assembly of claim 10, wherein the focal length of the image capturing optical lens assembly is f, and a focal length of the first lens element is f1, the following relationship is satisfied:

$$0.4<f/f1<1.3.$$

12. The image capturing optical lens assembly of claim 10, wherein the curvature radius of the object-side surface of the fourth lens element is R7, and the curvature radius of the image-side surface of the fourth lens element is R8, the following relationship is satisfied:

$$-4.3<R7/R8<-0.8.$$

13. The image capturing optical lens assembly of claim 10, wherein the third lens element has a convex object-side surface and a concave image-side surface.

14. An image capturing optical lens assembly comprising, in order from an object side to an image side:
- a first lens element with positive refractive power;
- a second lens element with negative refractive power;
- a third lens element with refractive power, wherein an object-side surface and an image-side surface of the third lens element are aspheric;
- a fourth lens element with positive refractive power having a convex object-side surface and a convex image-side surface; and
- a fifth lens element with refractive power which is made of plastic material and has a concave image-side surface, wherein an object-side surface and the image-side surface of the fifth lens element are aspheric, and the fifth lens element has at least one inflection point formed on at least one of the object-side surface and the image-side surface thereof;
- wherein the image capturing optical lens assembly has a total of five lens elements with refractive power, a curvature radius of the object-side surface of the fourth lens element is R7, a curvature radius of the image-side surface of the fourth lens element is R8, a focal length of the image capturing optical lens assembly is f, a focal length of the first lens element is f1, a curvature radius of the object-side surface of the second lens element is R3, and a curvature radius of the image-side surface of the second lens element is R4, the following relationships are satisfied:

$$-5.8<R7/R8<0;$$

$$0.4<f/f1<1.3; \text{ and}$$

$$0<(R3+R4)/(R3-R4)\leq 2.61.$$

15. The image capturing optical lens assembly of claim 14, wherein the Abbe number of the first lens element is V1, and the Abbe number of the second lens element is V2, the following relationship is satisfied:

$$30<V1-V2<42.$$

16. The image capturing optical lens assembly of claim 14, wherein the focal length of the image capturing optical lens assembly is f, and the focal length of the second lens element is f2, the following relationship is satisfied:

$$-1.4<f/f2<-0.61.$$

17. The image capturing optical lens assembly of claim 14, wherein the focal length of the image capturing optical lens assembly is f, and a focal length of the fourth lens element is f4, the following relationship is satisfied:

$$1.1<f/f4<3.0.$$

18. An image capturing optical lens assembly comprising, in order from an object side to an image side:
- a first lens element with positive refractive power having a convex object-side surface and a concave image-side surface;
- a second lens element with negative refractive power;
- a third lens element with refractive power, wherein an object-side surface and an image-side surface of the third lens element are aspheric;
- a fourth lens element with positive refractive power having a convex object-side surface and a convex image-side surface; and
- to a fifth lens element with refractive power which is made of plastic material and has a concave image-side surface, wherein an object-side surface and the image-side surface of the fifth lens element are aspheric; and the fifth lens element has at least one inflection point formed on at least one of the object-side surface and the image-side surface thereof;
- wherein the image capturing optical lens assembly has a total of five lens elements with refractive power, a curvature radius of the object-side surface of the fourth lens element is R7, a curvature radius of the image-side surface of the fourth lens element is R8, a focal length of the image capturing optical lens assembly is f, a focal length of the first lens element is f1, a focal length of the second lens element is f2, and a focal length of the fourth lens element is f4, the following relationships are satisfied:

$$-3.3<R7/R8<0;$$

$$1.1<f/f4<3.0; \text{ and}$$

$$-1.3<f1/f2<-0.48.$$

19. The image capturing optical lens assembly of claim 18, wherein a curvature radius of the object-side surface of the fourth lens element is R7, and a curvature radius of the image-side surface of the fourth lens element is R8, the following relationship is satisfied:

$$-3.3<R7/R8<-0.8.$$

20. The image capturing optical lens assembly of claim 18, wherein a curvature radius of the object-side surface of the second lens element is R3, and a curvature radius of the image-side surface of the second lens element is R4, the following relationship is satisfied:

$$0<(R3+R4)/(R3-R4)<3.0.$$

21. The image capturing optical lens assembly of claim 18, wherein the third lens element has a convex object-side surface.

* * * * *

UNITED STATES PATENT AND TRADEMARK OFFICE
CERTIFICATE OF CORRECTION

PATENT NO. : 8,917,458 B2
APPLICATION NO. : 13/404008
DATED : December 23, 2014
INVENTOR(S) : Tsai et al.

It is certified that error appears in the above-identified patent and that said Letters Patent is hereby corrected as shown below:

In the Claims, (1) In column 31, line 37, Claim 1 of the issued patent reads as "a convex to object-side surface...", but it should read as "a convex object-side surface...".
(2) In column 32, lines 16-17, Claim 6 of the issued patent reads as "...the Abbe number of the first lens element is V1, and the Abbe number of the second lens element is V2...", but it should read as "...an Abbe number of the first lens element is V1, and an Abbe number of the second lens element is V2...".
(3) In column 32, line 22, Claim 7 of the issued patent reads as "..., and the focal length of the second lens element...", but it should read as "..., and a focal length of the second lens element...".
(4) In column 32, line 55, Claim 9 of the issued patent reads as "..., the focal length of the second lens element is f2...", but it should read as "..., a focal length of the second lens element is f2...".
(5) In column 33, lines 44-46, Claim 14 of the issued patent reads as "...a curvature radius of the object-side surface of the second lens element is R3, and a curvature radius of the image-side surface of the...", but it should read as "...a curvature radius of an object-side surface of the second lens element is R3, and a curvature radius of an image-side surface of the...".
(6) In column 33, lines 55-56, Claim 15 of the issued patent reads as "...the Abbe number of the first lens element is V1, and the Abbe number of the second lens element is V2...", but it should read as "...an Abbe number of the first lens element is V1, and an Abbe number of the second lens element is V2...".
(7) In column 34, line 1, Claim 16 of the issued patent reads as "...the focal length of the second lens element", but it should read as "...a focal length of the second lens element".
(8) In column 34, line 23, Claim 18 of the issued patent reads as "to a fifth lens element...", but it should read as "a fifth lens element...".
(9) In column 34, line 45-46, Claim 19 of the issued patent reads as "...a curvature radius of the object-side surface of the fourth lens element is R7, and a curvature radius of the...", but it should read as "...the curvature radius of the object-side surface of the fourth lens element is R7, and the curvature radius of the...".

Signed and Sealed this
Nineteenth Day of May, 2015

Michelle K. Lee
*Director of the United States Patent and Trademark Office*